(12) United States Patent
Nagata et al.

(10) Patent No.: US 7,706,690 B2
(45) Date of Patent: Apr. 27, 2010

(54) RELAY NODE IN OPTICAL NETWORKS

(75) Inventors: Akira Nagata, Kawasaki (JP); Keiji Miyazaki, Kawasaki (JP); Shinya Kanoh, Kawasaki (JP); Yasuki Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

(21) Appl. No.: 11/471,593

(22) Filed: Jun. 21, 2006

(65) Prior Publication Data

US 2007/0230961 A1    Oct. 4, 2007

(30) Foreign Application Priority Data

Mar. 29, 2006    (JP)    ............................. 2006-091870

(51) Int. Cl.
*H04J 14/02*    (2006.01)
(52) U.S. Cl. ............................. 398/83; 398/82; 398/79
(58) Field of Classification Search .................... 398/83, 398/82, 79
See application file for complete search history.

(56) References Cited

U.S. PATENT DOCUMENTS

2003/0215238 A1* 11/2003 Milton et al. ................. 398/83

2006/0067694 A1* 3/2006 Nozu ........................... 398/83

FOREIGN PATENT DOCUMENTS

WO    WO 2005/032076 A1    4/2005
WO    WO 2005032076 A1 *    4/2005

* cited by examiner

*Primary Examiner*—Quan-Zhen Wang
(74) *Attorney, Agent, or Firm*—Staas & Halsey LLP

(57) ABSTRACT

A relay node used in a WDM optical network is disclosed. The relay node includes: a high-speed side port configured to send and receive a high-speed signal; a low-speed side port configured to send and receive a low-speed signal; a unit configured to generates a checking message for requesting another node to report constraint information of a low-speed side port of the another node, wherein the constraint information relates to adding an optical signal from the low-speed side port to a high-speed side port of the another node or dropping an optical signal from the high-speed side port to the low-speed side port of the another node; a unit configured to generate a response message including the constraint information of the own node in response to receiving the checking message sent from the another node; and a storing unit configured to store at least the constraint information of the another node.

20 Claims, 27 Drawing Sheets

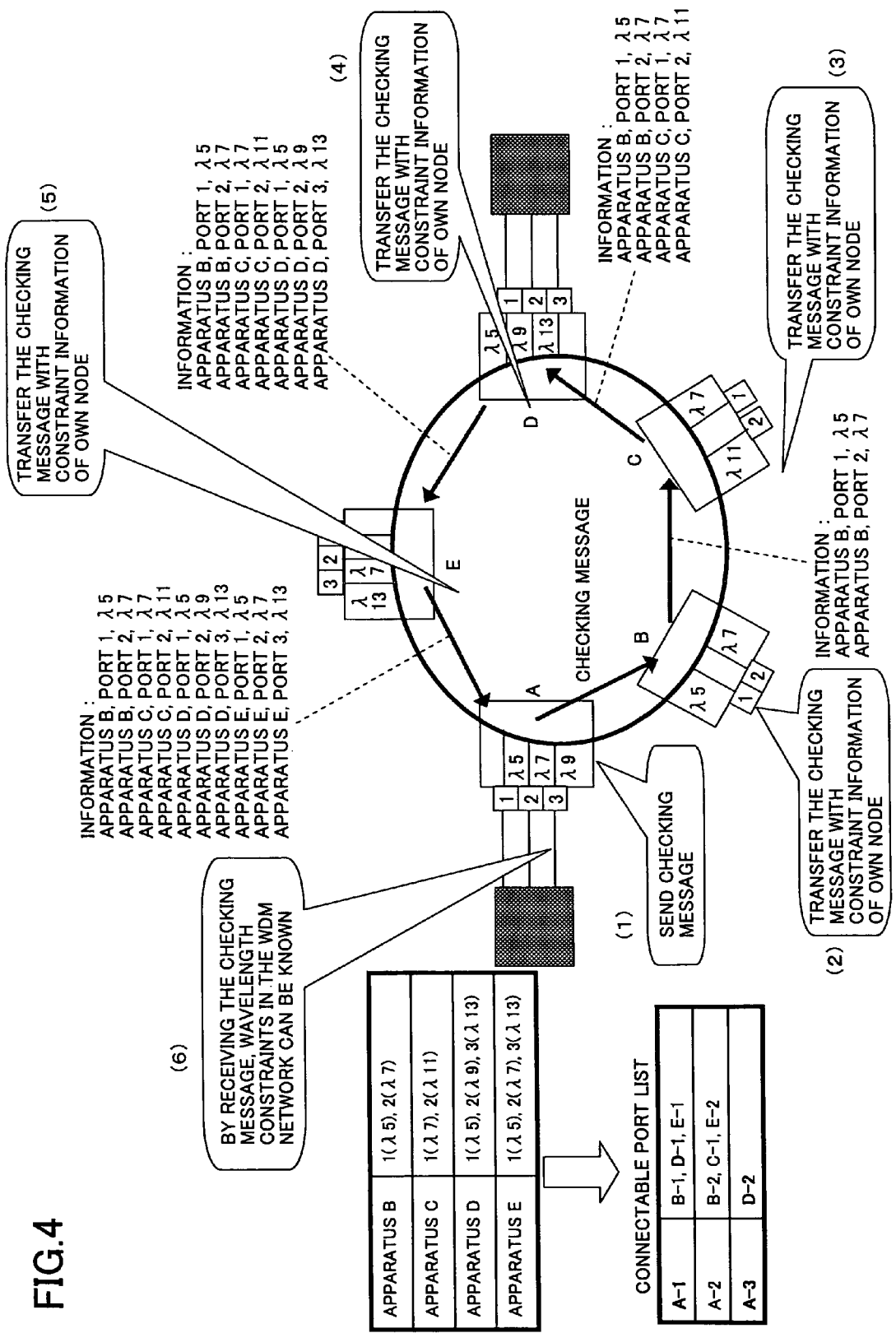

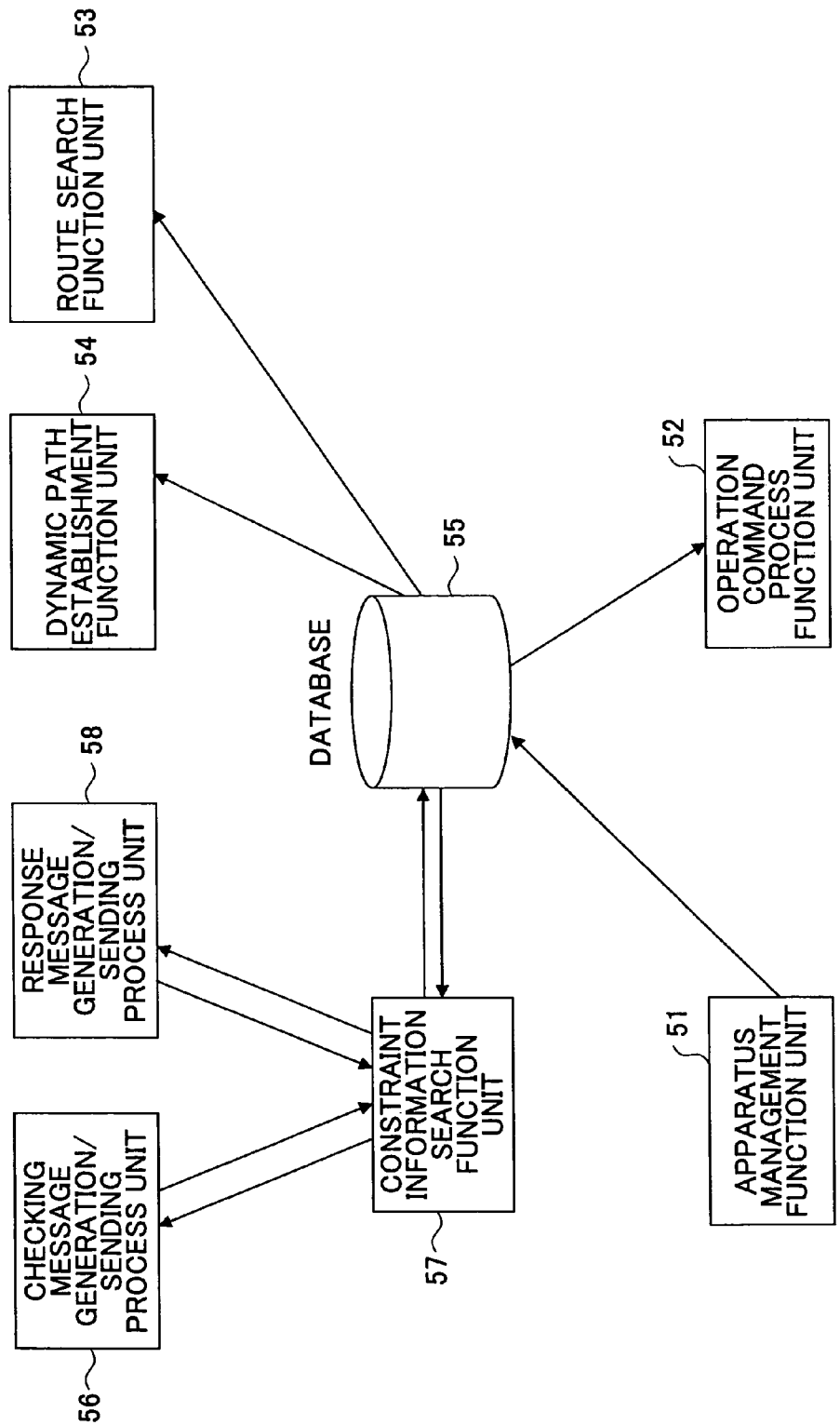

FIG.6A

| APPARATUS | LOW-SPEED PORT IDENTIFICATION INFORMATION | WAVELENGTH INFORMATION AVAILABLE FOR ADD/DROP |
|---|---|---|
| B | 1 | $\lambda 5$ |
| B | 2 | $\lambda 7$ |
| C | 1 | $\lambda 7$ |
| C | 2 | $\lambda 11$ |
| D | 1 | $\lambda 5$ |
| D | 2 | $\lambda 9$ |
| D | 3 | $\lambda 13$ |
| E | 1 | $\lambda 5$ |
| E | 2 | $\lambda 7$ |
| E | 3 | $\lambda 13$ |

FIG.6B

| APPARATUS | LOW-SPEED PORT IDENTIFICATION INFORMATION | WAVELENGTH INFORMATION AVAILABLE FOR ADD/DROP | USE STATUS 1:IN USE 2:IDLE |
|---|---|---|---|
| B | 1 | $\lambda 5$ | 1 |
| B | 2 | $\lambda 7$ | 0 |
| C | 1 | $\lambda 7$ | 1 |
| C | 2 | $\lambda 11$ | 1 |
| D | 1 | $\lambda 5$ | 1 |
| D | 2 | $\lambda 9$ | 0 |
| D | 3 | $\lambda 13$ | 0 |
| E | 1 | $\lambda 5$ | 0 |
| E | 2 | $\lambda 7$ | 0 |
| E | 3 | $\lambda 13$ | 0 |

FIG.6C

| APPARATUS | LOW-SPEED PORT IDENTIFICATION INFORMATION | WAVELENGTH INFORMATION AVAILABLE FOR ADD/DROP | CONNECTABLE WDM PORT INFORMATION |
|---|---|---|---|
| B | 1 | $\lambda 5$ | 10,20 |
| B | 2 | $\lambda 7$ | 10,20 |
| C | 1 | $\lambda 7$ | 10,20 |
| C | 2 | $\lambda 11$ | 10,20 |
| D | 1 | $\lambda 5$ | 10 |
| D | 2 | $\lambda 9$ | 10,20 |
| D | 3 | $\lambda 13$ | 20 |
| E | 1 | $\lambda 5$ | 10,20 |
| E | 2 | $\lambda 7$ | 10,20 |
| E | 3 | $\lambda 13$ | 20 |

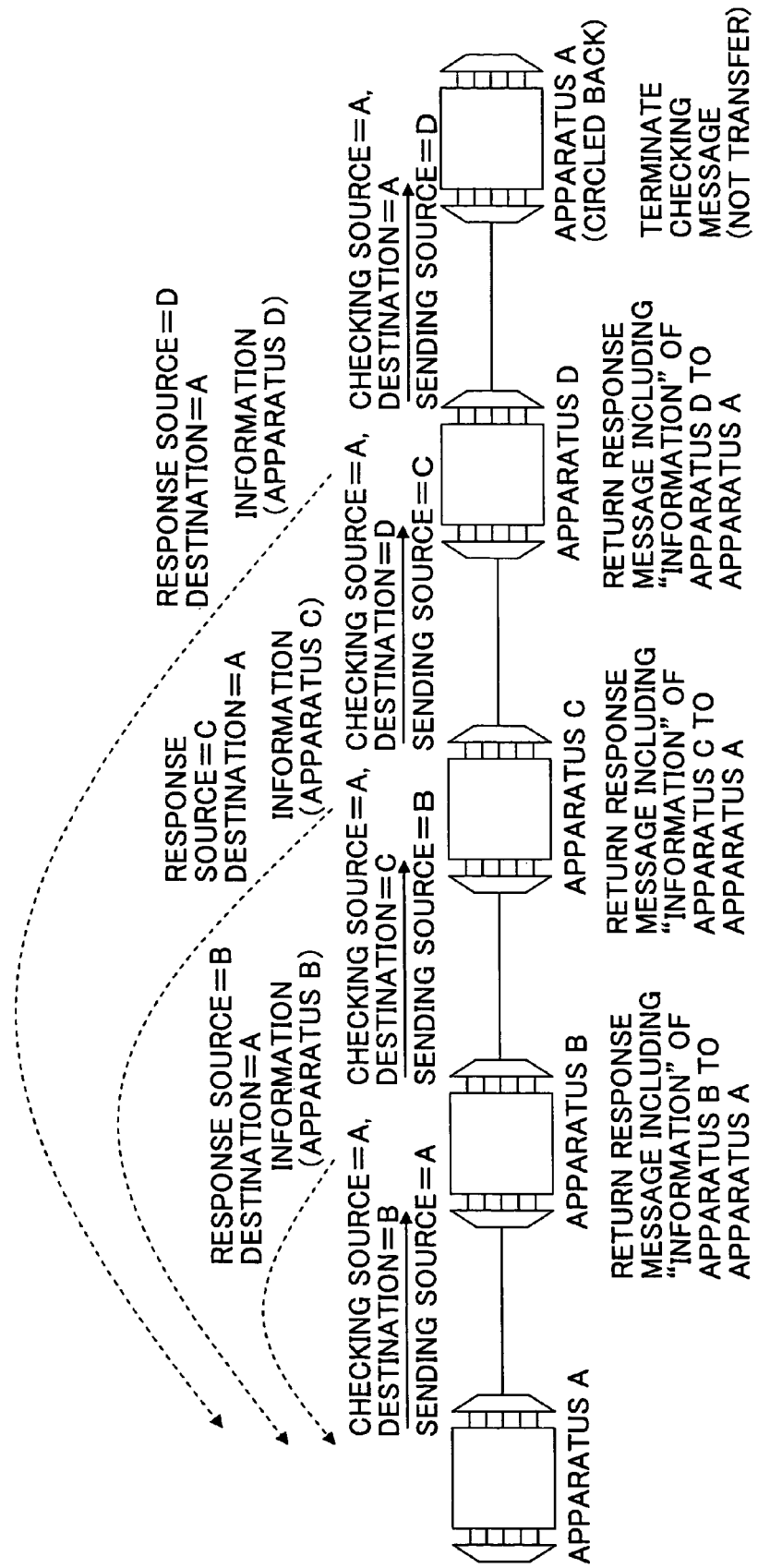

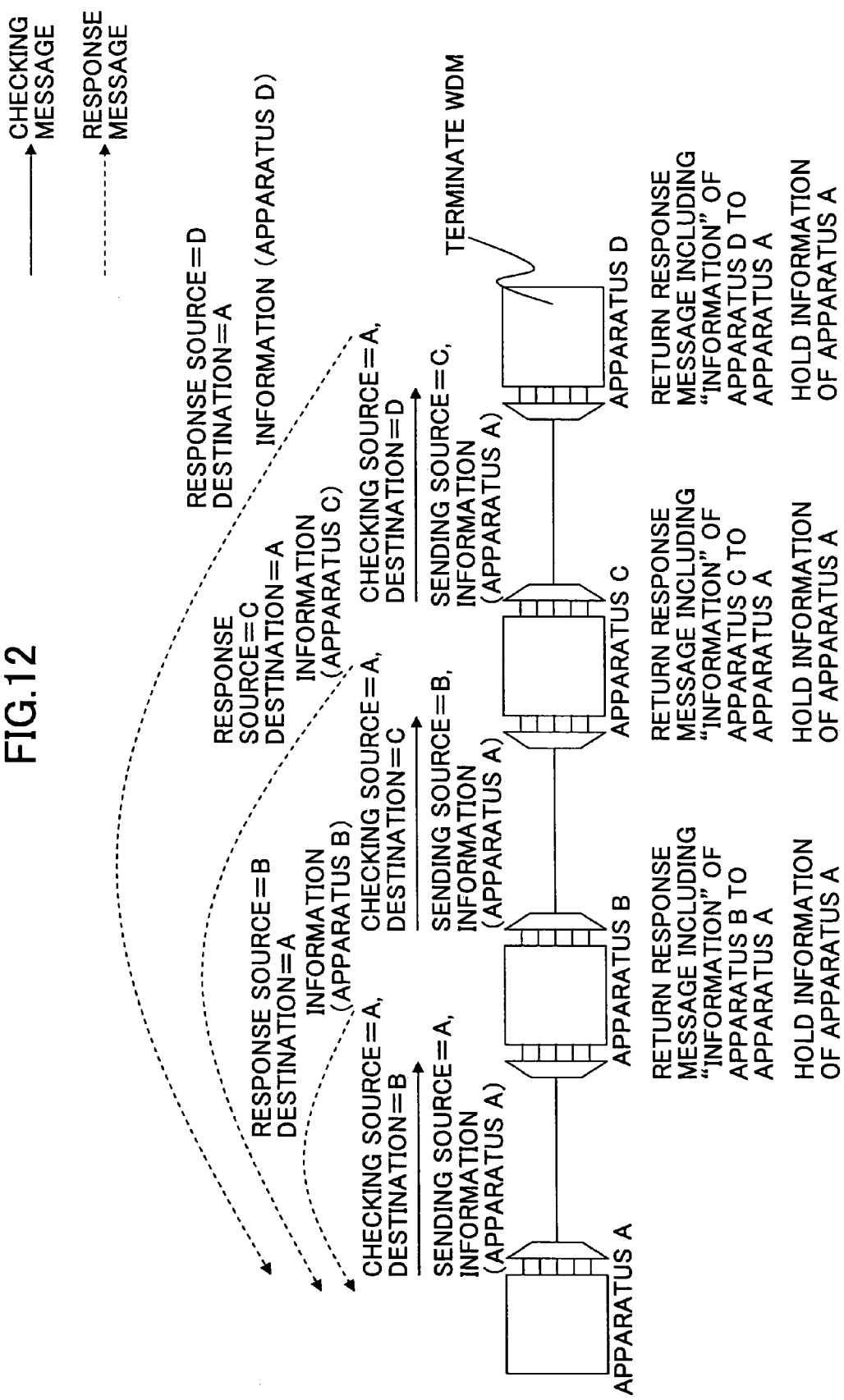

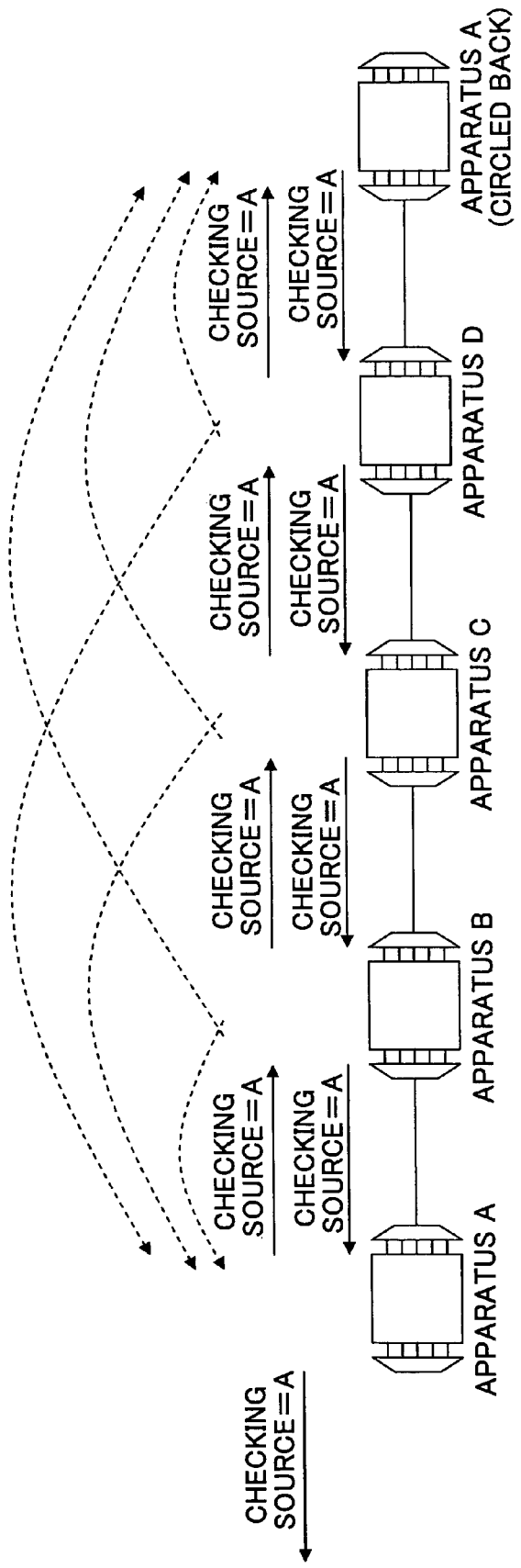

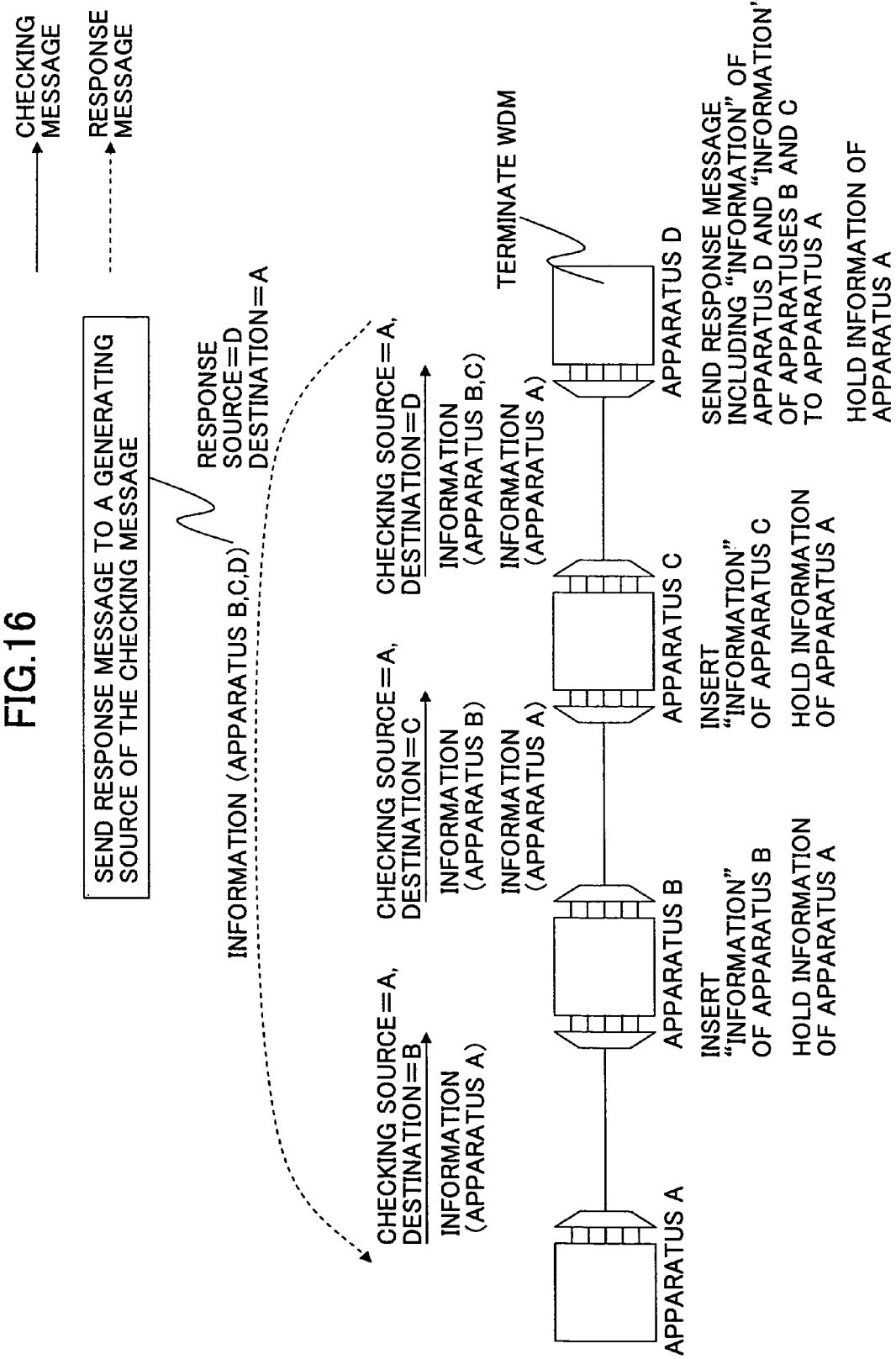

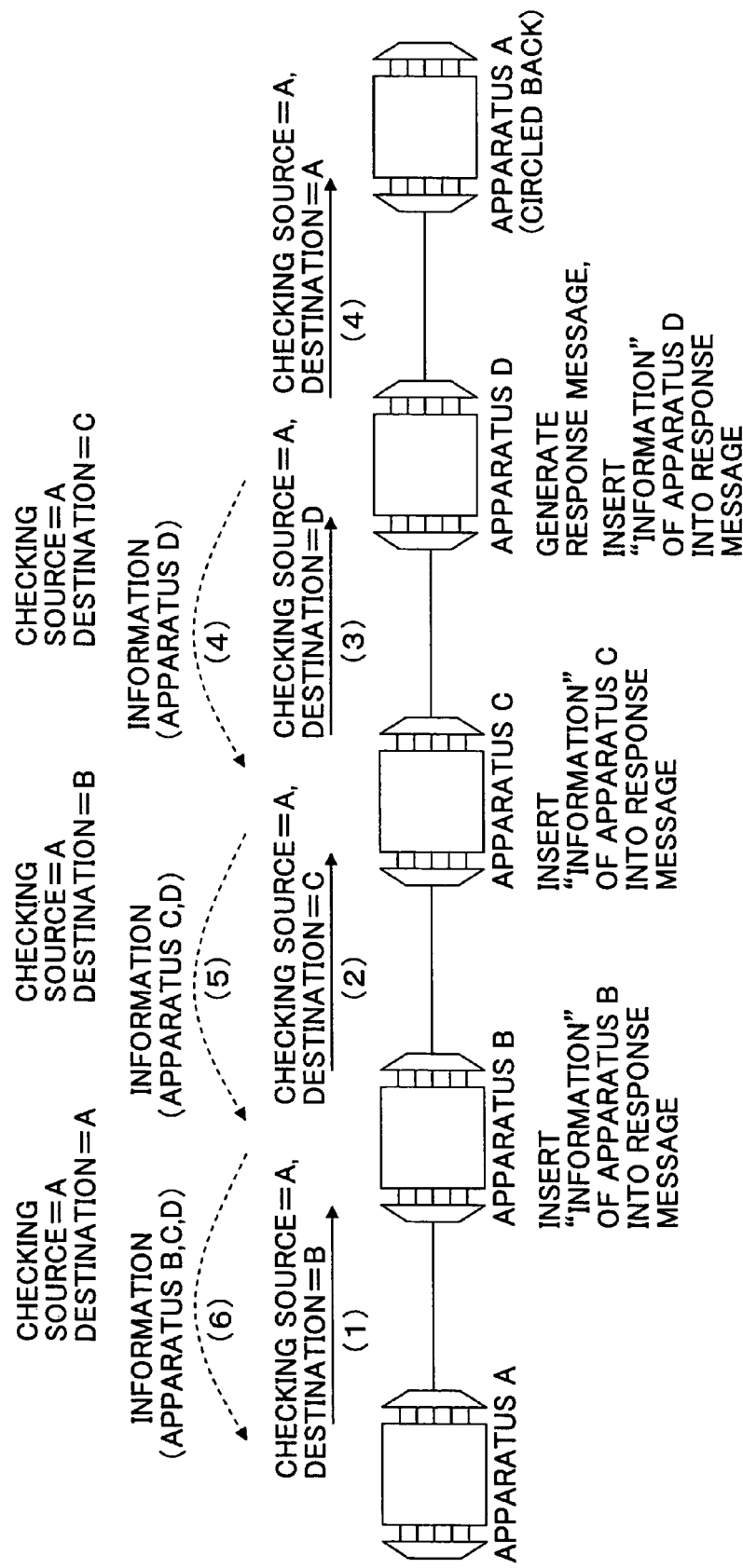

RELAY NODE IN OPTICAL NETWORKS

BACKGROUND OF THE INVENTION

1. Field of the Invention

The present invention relates to the technical field of optical networks. More particularly, the present invention relates to relay nodes used in the optical networks of the Wavelength Division Multiplexing (WDM) scheme.

2. Description of the Related Art

As demands for communications such as the Internet, broadband services and the like increase in recent years, necessity for increasing distance, speed and capacity of the communications is increasing more and more. In the WDM scheme, lights of various wavelengths are multiplexed and transmitted so that high-speed and large-capacity can be realized. A relay node used in the conventional WDM optical network performs routing (transferring) by converting an optical signal into an electrical signal, then, converting the electrical signal into the optical signal again. However, the converting processing between the optical signal and the electrical signal increases the overhead in routing, so that it causes complexity of processing and causes transmission delay. The following patent document 1 discloses a technique for performing path setting such that the transmission distance becomes long as much as possible without optical/electrical/optical (O/E/O) conversion.

In recent years, the GMPLS (Generalized Multi Protocol Label Switching) protocol is widely noticed as a protocol for automatically setting a path (to be also referred to as "routing route", "connection", etc.) by recognizing wavelengths of various colors of lights as labels as it is. In the GMPLS, the routing route is determined based on the wavelength of the optical signal, and data is transmitted as the optical signal, so that the problem due to the electrical signal conversion can be largely decreased.

[Patent document 1] International Publication No. 2005/032076 pamphlet

For every optical signal of every wavelength provided in the system, if the relay node forming the optical network can perform signal adding from low-speed side ports to high-speed side ports or can perform signal dropping from the high-speed side ports to the low-speed side ports, desired connections may be constructed quickly and automatically using the GMPLS protocol. However, the high-performance relay node that can use all of the various wavelengths without limitation is very expensive and such relay node is not so widely used actually. Rather, there are many inexpensive apparatuses having limitations in wavelengths and in input/output ports that can perform add/drop in an optical fiber. By the way, the relay node is a node that performs both or one of adding an optical signal into the optical fiber of the WDM optical network and dropping the optical signal from the optical fiber, and the relay node may be called an Add/Drop Module (ADM) or Add/Drop Multiplexing Module or the like.

In the relay node shown in FIG. 1, any of the four kinds of the wavelengths $\lambda_1$-$\lambda_4$ can be added to or dropped from the optical fiber. In the example shown in the figure, the low-speed side port #2 is different from the low-speed side port #1, and the low-speed side port #2 cannot add an optical signal to the WDM port #10 side and cannot drop an optical signal from the WDM port #10. But, since there is no limitation for wavelengths to be dropped or added in this relay node, this relay node belongs to the before-mentioned expensive relay node, and is also called DOADM (Dynamic Optical ADM). On the other hand, in the low-speed side port #1 of the relay node shown in FIG. 2, only an optical signal of a first wavelength $\lambda_1$ can be dropped or added. In the low-speed side port #2, only an optical signal of a fourth wavelength $\lambda_4$ can be dropped or added. Optical signals of second and third wavelengths $\lambda_2$, $\lambda_3$ cannot be dropped or added. This relay node belongs to the above-mentioned inexpensive apparatus, and may be called ROADM (Reconfigurable Optical ADM).

When there is a limitation for the wavelength that can be added/dropped in the low-speed side port in the relay node, connections cannot be properly established only by using the connection setting method of the GMPLS protocol. Therefore, it may be considered to establish a connection manually by checking constraints of individual relay nodes at each time (especially, kinds of usable low-speed side ports, and information of wavelengths that can be added/dropped). However, such method is practically very inconvenient. Or, it may be considered to provide a central management station for managing constraints of all relay nodes used in the optical network collectively and providing instructions when setting the connection. However, such management workload is extremely heavy so that it is feared that it becomes difficult to set the connection quickly as necessary.

SUMMARY OF THE INVENTION

The present invention is contrived in view of the above-mentioned problems, and an object of the present invention is to provide a relay node for easily establishing a connection in a WDM optical network including relay nodes having constraints in available ports and wavelengths.

The object is achieved by a relay node used in a WDM optical network, including:

a high-speed side port configured to send and receive a high-speed signal;

a low-speed side port configured to send and receive a low-speed signal;

a unit configured to generate a checking message for requesting another node to report constraint information of a low-speed side port of the another node, wherein the constraint information relates to adding an optical signal from the low-speed side port to a high-speed side port of the another node or dropping an optical signal from the high-speed side port to the low-speed side port of the another node;

a unit configured to generate a response message including the constraint information of the own node in response to receiving the checking message sent from the another node; and a storing unit configured to store at least the constraint information of the another node.

According to the present invention, a connection can be easily established in a WDM optical network including relay nodes having constraints in available ports and wavelengths.

BRIEF DESCRIPTION OF THE DRAWINGS

Other objects, features and advantages of the present invention will become more apparent from the following detailed description when read in conjunction with the accompanying drawings, in which:

FIG. 4 shows a method for establishing a connection according to the embodiment of the present invention;

FIG. 5 is a partial functional block diagram of a relay node;

FIG. 6A shows an example of the constraint information stored in the database;

FIG. 6B shows an example of the constraint information stored in the database;

FIG. 6C shows an example of the constraint information stored in the database;

FIG. 11B shows a situation (2) in which the checking/response message is transmitted in a ring type network;

FIG. 12 shows a situation (2-2) in which the checking/response message is transmitted in a bus type network;

FIG. 13A shows a situation (2-3) in which the checking/response message is transmitted in a ring type network;

FIG. 16 shows a situation (3-2) in which the checking/response message is transmitted in a bus type network;

FIG. 17B shows a situation (4) in which the checking/response message is transmitted in a ring type network;

DETAILED DESCRIPTION OF THE PREFERRED EMBODIMENTS

Figure 1:
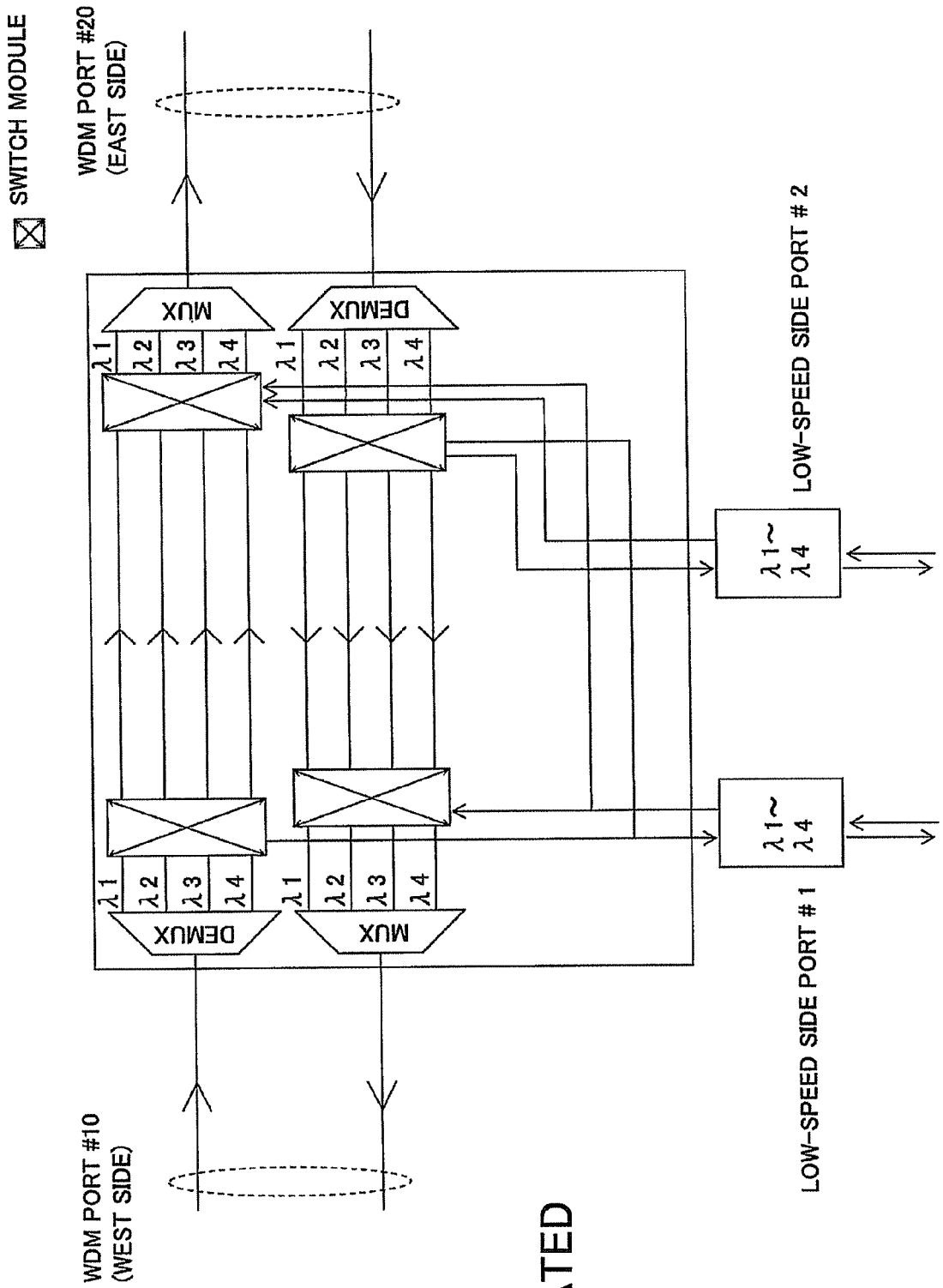
FIG. 1 shows a relay node having no constraint of wavelengths and ports.

In the following, embodiments of the present invention is described with reference to figures.

According to an embodiment of the present invention, the relay node generates a checking message for requesting another node to report constraint information (information on wavelength that can be added/dropped, for example) of a low-speed side port of the another node, wherein the constraint information relates to adding an optical signal from the low-speed side port to a high-speed side port of the another node or dropping an optical signal from the high-speed side port to the low-speed side port of the another node. In addition, the relay unit generates a response message including the constraint information of the own node in response to receiving the checking message sent from the another node. Accordingly, by using the checking/response message, constraint information of other nodes can be collected, so that basic information for forming a proper connection can be easily obtained. By using the existing GMPLS protocol in consideration of constraints, the connection can be efficiently established.

The checking message may be sent when the relay node starts up, or may be sent periodically. In addition, the checking message may be sent when usage of both or one of the high-speed side port and the low-speed-side port is changed. By sending the checking message when the relay node starts up, constraint information of other nodes can be stored at an initial setting stage, so that the information can be referred to for establishing a connection after that. By sending the checking message after the relay node starts up, the constraint information in the database can be updated to the newest state so that connection candidates can be determined more properly.

The constraint information may include information indicating a use status (perform or not perform cross connection via the low-speed side port) of the low-speed side port. In addition, the constraint information may include information indicating a high-speed side port to which an optical signal can be added or from which an optical signal can be dropped. Accordingly, the connection candidate can be determined more properly.

The checking message sent from the own node may include constraint information of the own node. Accordingly, overlaps of the checking/response massages can be reduced.

The checking message may be generated and sent individually for each of other nodes. Accordingly, the constraint information can be collected easily and with reliability.

The checking message may be sent only to an adjacent other node. Accordingly, a checking message is transferred to each relay node in order, so that it can be efficiently avoided to generate and send the checking messages and response messages redundantly.

When a source of a checking message received from another node is the own node, transfer of the checking message to the adjacent other node may be prohibited. Accordingly, transfer of the checking message can be properly stopped in a ring type network.

The checking message sent from a checking source may be transmitted to a plurality of adjacent nodes. Accordingly, the checking message can be quickly transmitted to the relay node in the network.

The checking message may include checking identification information that is assigned to each checking activity. When the relay node receives the checking message including checking identification information the same as the checking identification information of a checking message for which a response is already sent, generation of a response message may be prohibited. Accordingly, it can be effectively avoided to transfer the checking message redundantly and send the response message redundantly.

When a generated new message is the same as a response message that is already sent, transmission of the new response message may be prohibited. Accordingly, the redundant message transmission can be avoided without providing the ID to the checking message.

When the relay node is an end node of a bus type WDM optical network, the relay node may send a response message. Accordingly, redundancy of the response message can be easily avoided.

Constraint information of the own node may be added to the checking message received from an adjacent node, and the checking message to which the constraint information is added may be sent to another adjacent node or to a checking source. This feature can effectively reduce whole traffic that arises when each relay node in the network individually collects the constraint information.

In this case, a response message may be sent to the adjacent node. Accordingly, a packet can be transmitted according to a transmission sequence of the GMPLS protocol.

First Embodiment

Figure 3:
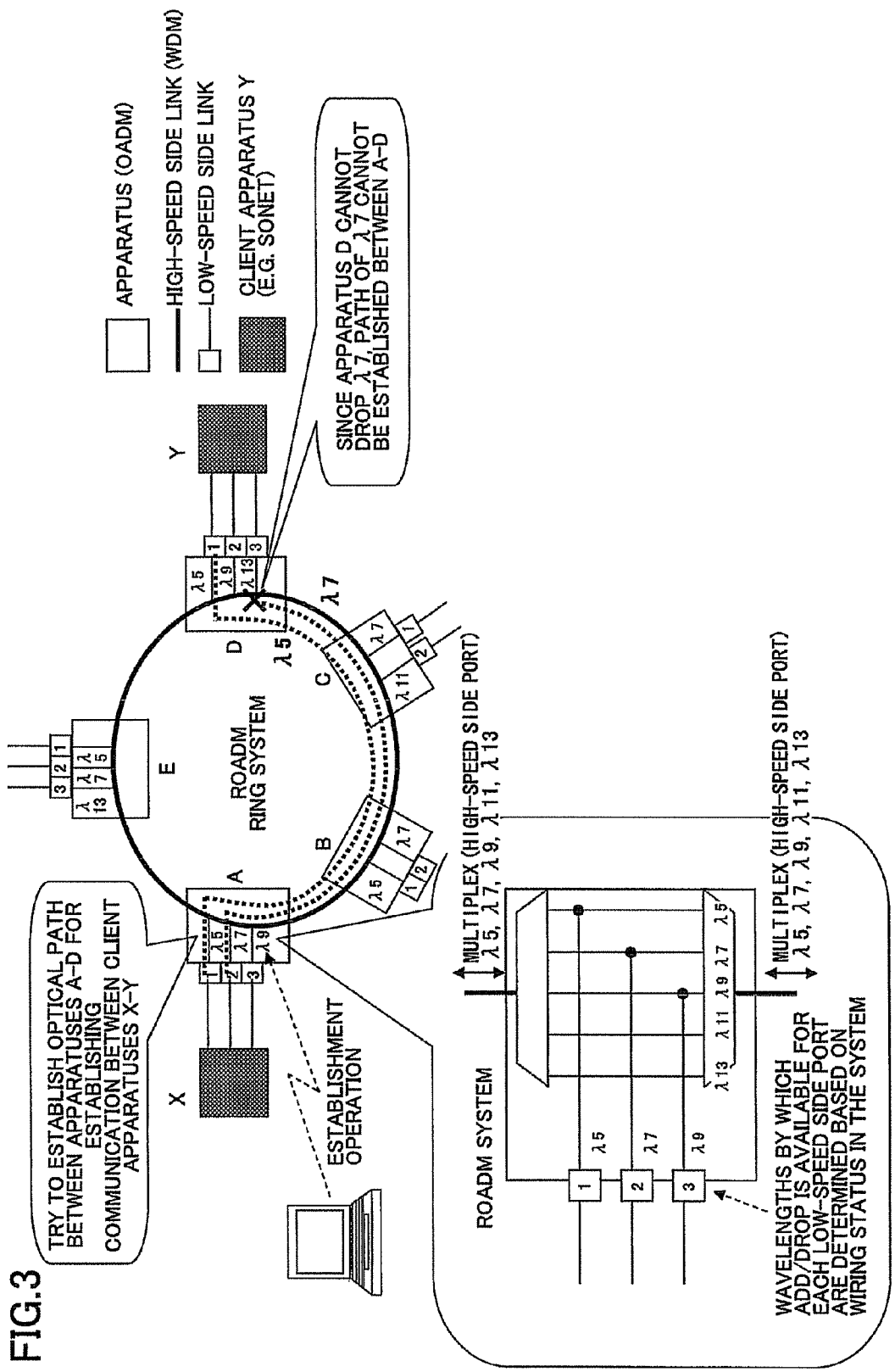
FIG. 3 shows a WDM optical network in an embodiment of the present invention.

FIG. 3 shows a WDM optical network in the first embodiment of the present invention. FIG. 3 shows a high-speed transmission route indicated by a thick solid line, relay nodes A-E, and client apparatuses X and Y. Although the system includes elements for adjusting optical power, performing distributed compensation and the like at midpoints of the high-speed transmission route, these elements are not shown in the figure for the sake of simplicity. The high-speed transmission route includes an optical fiber cable.

Each of the relay nodes A-E has similar configurations and functions, but, constraints on usable wavelengths and low-speed side ports are different for each relay node. As shown in a magnified view of the relay node A, the relay node includes one or more low-speed side ports for sending/receiving low-speed signals, one or more high-speed side ports for sending/receiving high-speed signals, a demultiplexer (DEMUX) for demultiplexing a wavelength-multiplexed optical signal into each wavelength component, and a multiplexer (MUX) for wavelength-multiplexing optical signals of a plurality of wavelengths. The high-speed side port sends/receives the optical signal transmitted over the high-speed transmission route of the WDM optical network. The low-speed side port is connected to the client apparatus as necessary so that the client can perform communication.

In the example shown in the figure, the relay node A includes three low-speed side ports, in which a first port is used for adding or dropping an optical signal of a fifth wavelength $\lambda_5$, a second port is used for adding or dropping an optical signal of a seventh wavelength $\lambda_7$, and a third port is used for adding or dropping an optical signal of a ninth wavelength $\lambda_9$. The relay node A cannot add or drop optical signals of an eleventh wavelength $\lambda_{11}$ and a thirteenth wavelength $\lambda_{13}$. These signals pass through the relay node A as it is. The constraints of each relay node may be different with each other.

It is assumed that the client apparatus X and the client apparatus Y are connected, and that communications are to be performed between them. In this case, it is necessary to establish a connection between the relay node A and the relay node D. In the example shown in the figure, the fifth wavelength $\lambda_5$ and the ninth wavelength $\lambda_9$ can be used. But, as mentioned above, such constraint in the relay node cannot be fully considered in the conventional technology. Thus, it was difficult to establish a connection between the relay nodes A and B efficiently and automatically in the conventional technology. As described below, according to the embodiment of the present invention, the connection can be easily and efficiently established by properly considering such constraints.

FIG. 4 shows a method for establishing connections according to the embodiment of the present invention. For establishing a connection between client apparatuses X and Y (between the relay nodes A and D), it is necessary to ascertain constraints in each relay node. For this purpose, the relay node A prepares a checking message, and sends the message to the adjacent relay node B (1). Each relay node receives the checking message from another node, and include correspondences between each low-speed side port and a wavelength that can be used by the low-speed side port (constraint or constraint information) into the checking message. The checking message is transferred to an adjacent node. In the example shown in the figure, the relay node B that receives the checking message transfers the constraint information of the own node to the relay node C with the checking message (2), wherein the constraint information indicates that first and second low-speed side ports can be used, the first low-speed side port can add/drop only optical signals of the fifth wavelength $\lambda_5$, and the second low-speed side port can add/drop only optical signals of the seventh wavelength $\lambda_7$. The relay node C that receives the checking message from the relay node B transfers the constraint information of the own node to the relay node D with the checking message (3), wherein the constraint information indicates that first and second low-speed side ports can be used, the first low-speed side port can add/drop only optical signals of the seventh wavelength $\lambda_7$, and the second low-speed side port can add/drop only optical signals of the eleventh wavelength $\lambda_{11}$. The relay node D that receives the checking message from the relay node C transfers the constraint information of the own node to the relay node E with the checking message (4), wherein the constraint information indicates that first, second and third low-speed side ports can be used, the first low-speed side port can add/drop only optical signals of the fifth wavelength $\lambda_5$, the second low-speed side port can add/drop only optical signals of the ninth wavelength $\lambda_9$ and the third low-speed side port can add/drop only optical signals of the thirteenth wavelength $\lambda_{13}$. The relay node E that receives the checking message from the relay node D transfers the constraint information of the own node to the relay node A with the checking message (5), wherein the constraint information indicates that first, second and third low-speed side ports can be used, the first low-speed side port can add/drop only optical signals of the fifth wavelength $\lambda_5$, the second low-speed side port can add/drop only optical signals of the seventh wavelength $\lambda_7$ and the third low-speed side port can add/drop only optical signals of the thirteenth wavelength $\lambda_{13}$. Accordingly, the relay-node A can ascertain constraints of each relay node so as to easily determine a low-speed side port of the own node and a low-speed side port of another node when establishing a connection (6). For establishing a connection between the relay nodes A and D, when the fifth wavelength $\lambda_5$ is used, the first low-speed side port of the relay node A is associated with the first low-speed side port of the relay node D. When the ninth wavelength $\lambda_9$ is used, the third low-speed side port of the relay node A is associated with the second low-speed side port of the relay node D. Therefore, when establishing a connection, the relay node A sends the instruction to each node adding such constraints so that a proper connection between the relay nodes A and D can be established easily.

In the example described above, although the constraint information of each relay node is concentrated only to the relay node A, the constraint information can be obtained by other node by performing the similar procedure. In addition, when the relay node A sends the checking message to the relay node B, constraint information of the relay node A may be sent to the relay node B, wherein the constraint information indicates that the constraint information indicates that first, second and third low-speed side ports can be used, the first low-speed side port can add/drop only optical signals of the fifth wavelength $\lambda_5$, the second low-speed side port can add/drop only optical signals of the seventh wavelength $\lambda_7$ and the third low-speed side port can add/drop only optical signals of the ninth wavelength $\lambda_9$.

FIG. 5 is a partial functional block diagram of the relay node. FIG. 5 shows an apparatus management function unit 51, an operation command process function unit 52, a route search function unit 53, a dynamic path establishment function unit 54, a database 55, a checking message process unit 56, a constraint information search function unit 57, and a response message process unit 58.

The apparatus management function unit 51 controls operation of various function units and process elements in the relay node. The operation command process function unit 52 performs processes on various commands received by the user, operator and the like. The route search function unit 53 searches for a path according to a command for requesting establishment of a connection. The dynamic path establishment function unit 54 determines a proper path in found paths. The database 55 stores constraint information of each relay node for each node. As mentioned above, the constraint information includes correspondence between a low-speed side port and wavelength that can be added/dropped by the low-speed side port. As described later, the constraint information may include information indicating a current status of the low-speed side port, wherein the information indicates that a low-speed side port is not connected to any apparatus, the low-speed side port is connected to an apparatus, for example). In addition, the constraint information may include information indicating that add/drop of an optical signal by a particular low-speed side port is limited to only a clockwise ring, limited to a counter clockwise ring, or add/drop of an optical signal by a particular low-speed side port is available for both of the rings, for example. Or, the constraint information may include information indicating that an optical signal can be added only to a particular high-speed side port side, or that an optical signal can be dropped only from a particular high-speed side port side. Further, the constrain information may include information indicating that all wavelengths can be dealt with for a node having no constraint on the wavelengths that can be added/dropped. For example, by setting all of flags of fields indicating availability for each wavelength to be 1, it can be represented that there is no wavelength constraint. The database 55 may include constraint information of the own node in addition to constraint information of other nodes. In addition to the constraint information, the database 55 may include information indicating a topology of the optical network and relay nodes that are connected to the optical network. The checking message process unit 56 includes functions for preparing, sending and receiving the checking message. Preparing the checking message includes adding constraint information of the own node to the checking message. The constraint information search function unit 57 includes functions for extracting constraint information from the checking message, and extracting the constraint information of the own node from the database. The response message process unit 58 includes functions for preparing, sending and receiving a response message for responding to the checking message.

Figure 2:
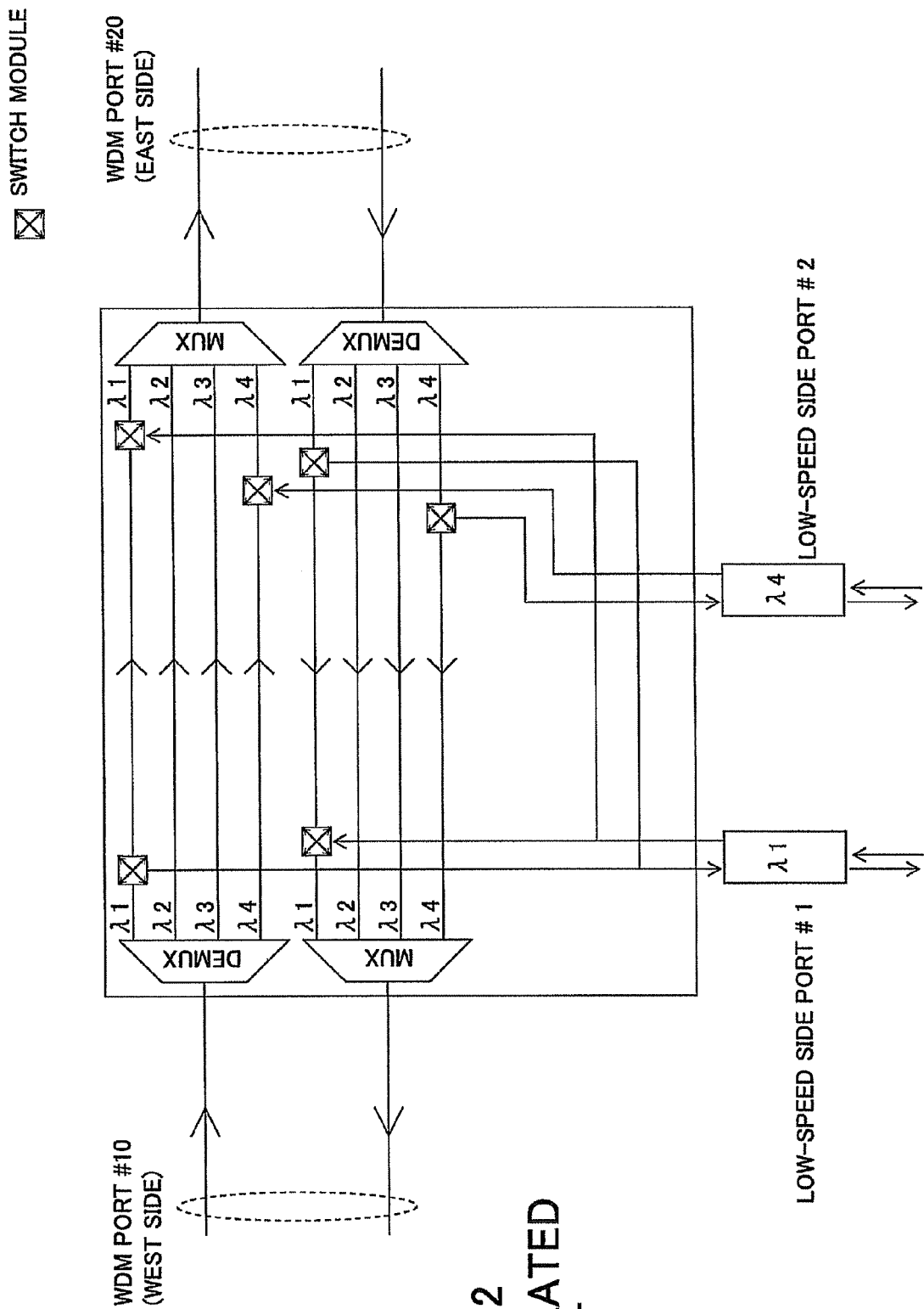
FIG. 2 shows a relay node having constraints of wavelengths and ports.

FIGS. 6A, 6B and 6C show examples 1, 2 and 3 of the constraint information stored in the database. Although these are assumed to be stored in the database of the relay node A, similar information may be also stored in other relay nodes. The example shown in FIG. 6A indicates the same information as one described with reference to FIG. 4. The example shown in FIG. 6B includes information indicating use status of each low-speed side port in addition to the information shown in FIG. 6A. Accordingly, connection candidates that can be connected can be selected more properly according to actual use status of the relay nodes. The example shown in FIG. 6C includes information indicating constraints of the low-speed side ports in more detail in addition to the example shown in FIG. 6A. In the figure, "10" and "20" are reference signs for identifying the high-speed side ports. For example, "10" may be associated with the West side, and "20" may be associated with the East side. In the example shown in FIGS. 1 and 2, the low-speed side port #2 can only add an optical signal to the East side and drop an optical signal from the East side, so the low-speed side port #2 cannot add/drop the optical signal to/from the West side. Such constrains of the low-speed side port may be stored in the database as shown in FIG. 6C. Accordingly, connection candidates that can be connected can be selected more precisely.

By the way, the checking message may be sent at various times, so that the message may be sent periodically or irregularly, or automatically or based on an instruction of an operator. Following are examples of the instants at which the checking message is sent, but the instant is not limited to these.

when the relay node is started (booted) up when a low-speed side port is added (when a card including a port is installed, or when the card is activated)

when a low-speed side port is deleted (when the card including the port is detached, or when the card is inactivated)

when a high-speed side port is added (when a card including a port is installed, or when the card is activated)

when a high-speed side port is deleted (when the card including the port is detached, or when the card is inactivated)

when use status of the port is changed (when the low-sped side port is connected to an apparatus, or is disconnected, for example)

when setting status of the port is changed (when the apparatus configuration of the relay node is changed so that usable wavelengths are changed, for example)

when the configuration of the optical network is changed (when a new relay node is connected, or a relay node is disconnected, for example)

As an example, the checking message is sent when starting up the node, at a periodic instant, or when the configuration of the apparatus or the network is changed. By sending the checking message when the relay node starts, constraint information of other nodes can be stored in the database of the relay node so that a connection can be properly established at any time after that. In addition to the instant of start-up, by sending the checking message periodically or sending the checking message when the configuration is changed, available candidates of connection can be updated to proper ones.

It is desirable that the checking message and the after-mentioned response message include fields for including following information in order to transmit various information properly.

field for identification information (ID) of a destination node (ID may be an IPv4 address, or may be an IPv6 address, or my be other identification information)

field for ID of a source node field for ID of a checking source or response source node field for information indicating that the message is a checking message or response message field for a checking activity ID that is assigned for each checking activity (the checking activity ID is described later)

field for constraint information (ID of relay node, ID of low-speed side node, wavelength that can be added/dropped, use status of port, direction that can be added/dropped, and the like)

By the way, it is desirable that the field length of the constraint information is variable in order to efficiently use communication resources.

Figure 7A:
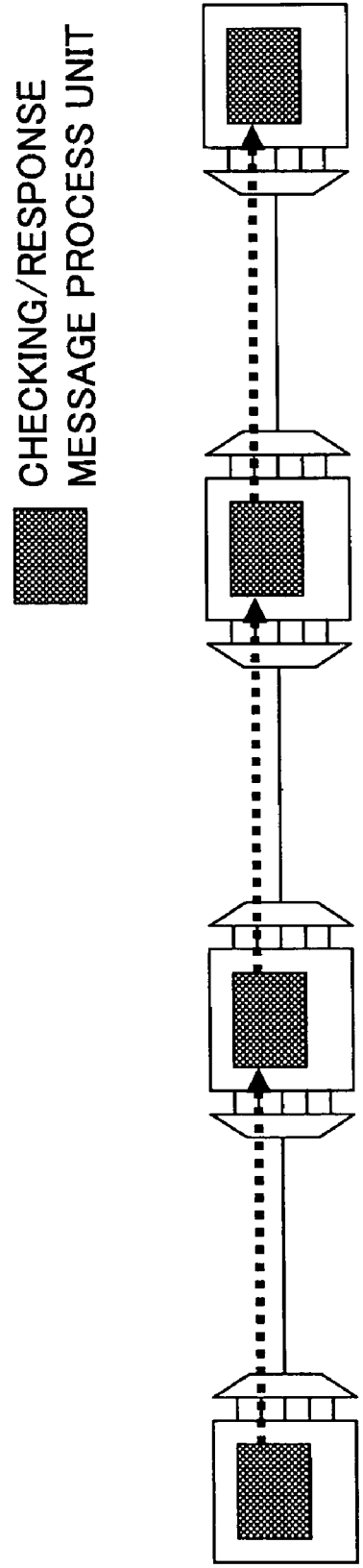
FIG. 7A shows a transmission scheme for a checking/response message.
Figure 7B:
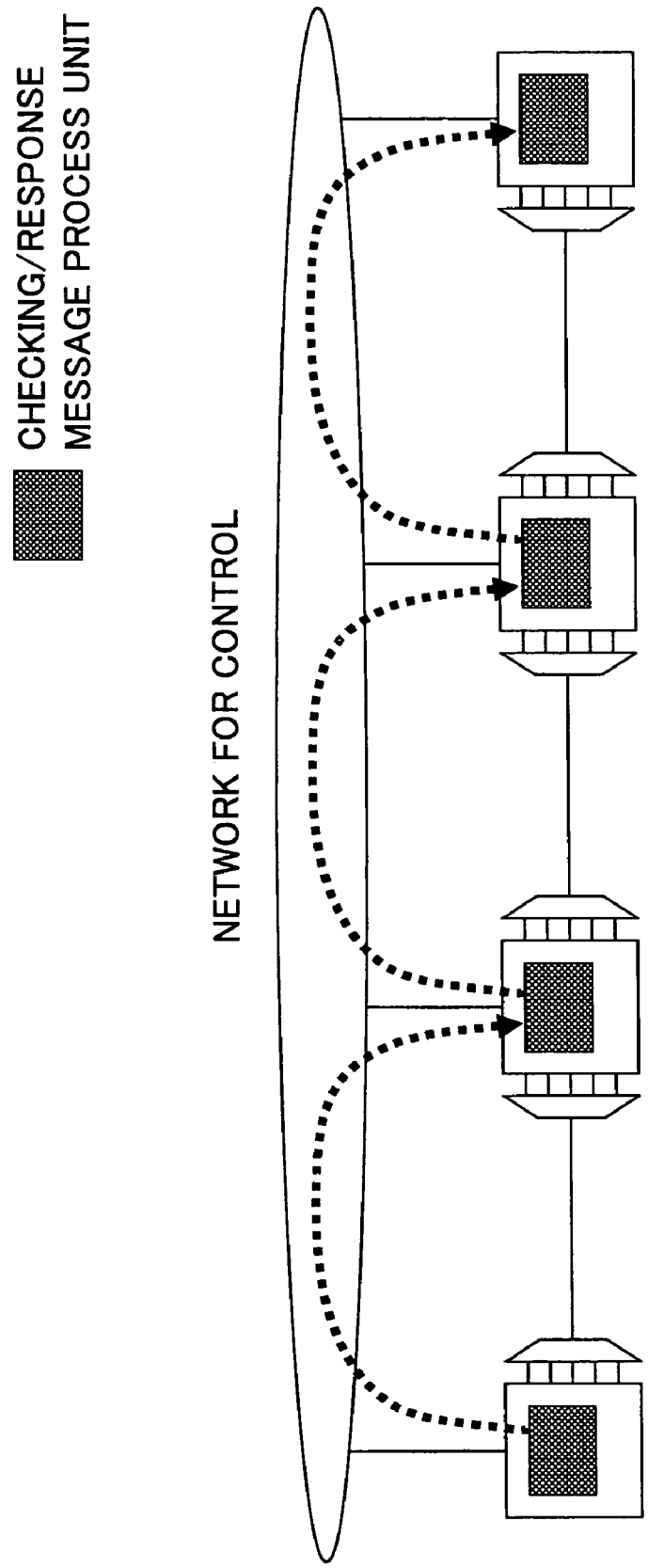
FIG. 7B shows a transmission scheme for a checking/response message.

One of or both of the checking message and the response message may be transmitted as an IP packet over the optical fiber cable of the WDM optical network as shown in FIG. 7A. In other words, a particular channel (wavelength) may be assigned for transmitting the checking or the response message. This method may be called an In-fiber scheme. Or, as shown in FIG. 7B, the checking or the response message may be transmitted over a line prepared separately from the optical fiber cable of the WDM optical network. An Ethernet line for maintenance and management can be used as the line, for example. This method may be called an Out-of-fiber scheme. In either case, the checking message and the response message can be transmitted using existing communication equipment.

Figure 8A:
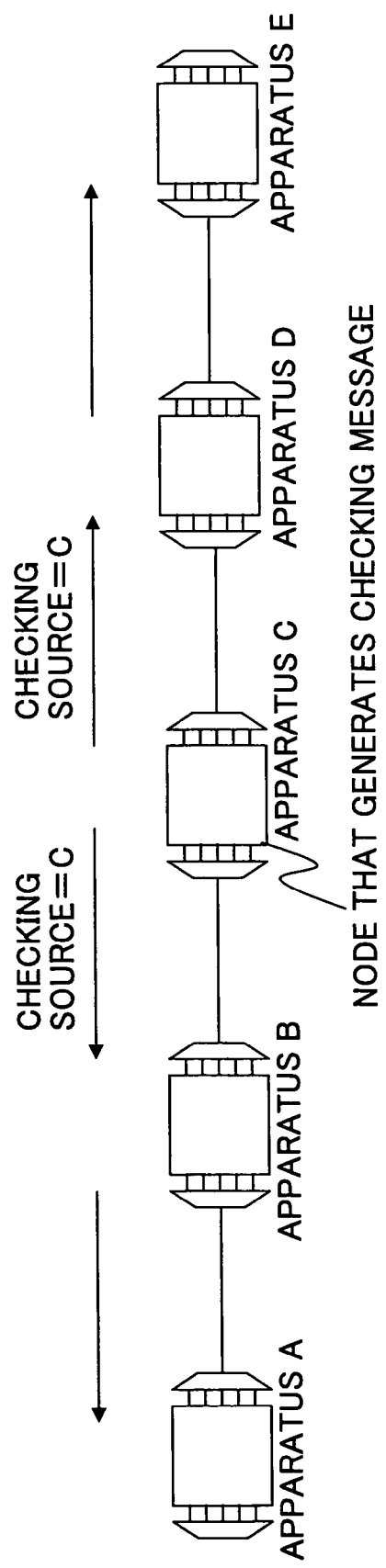
FIG. 8A shows a transmission scheme for a checking/response message.
Figure 8B:
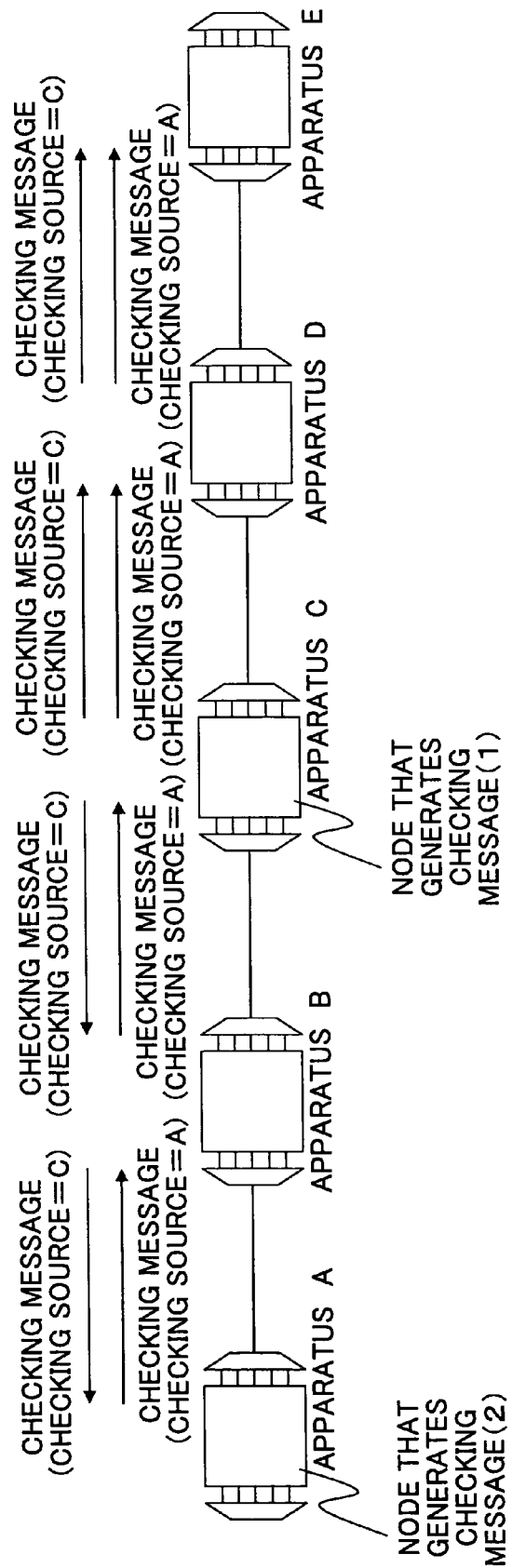
FIG. 8B shows a transmission scheme for a checking/response message.

As described following various embodiments, the transmission direction of the checking message or the response message may be a particular one direction, or may be bi-directional as shown in FIG. 8A. In addition, as shown in FIG. 8B, a checking message sent from a relay node (relay node A, for example) and a checking message sent from another relay node (relay node C, for example) may be transmitted independently with each other.

In the following, various examples on the transmission method of the checking/response message are described.

Second Embodiment

Figure 9:
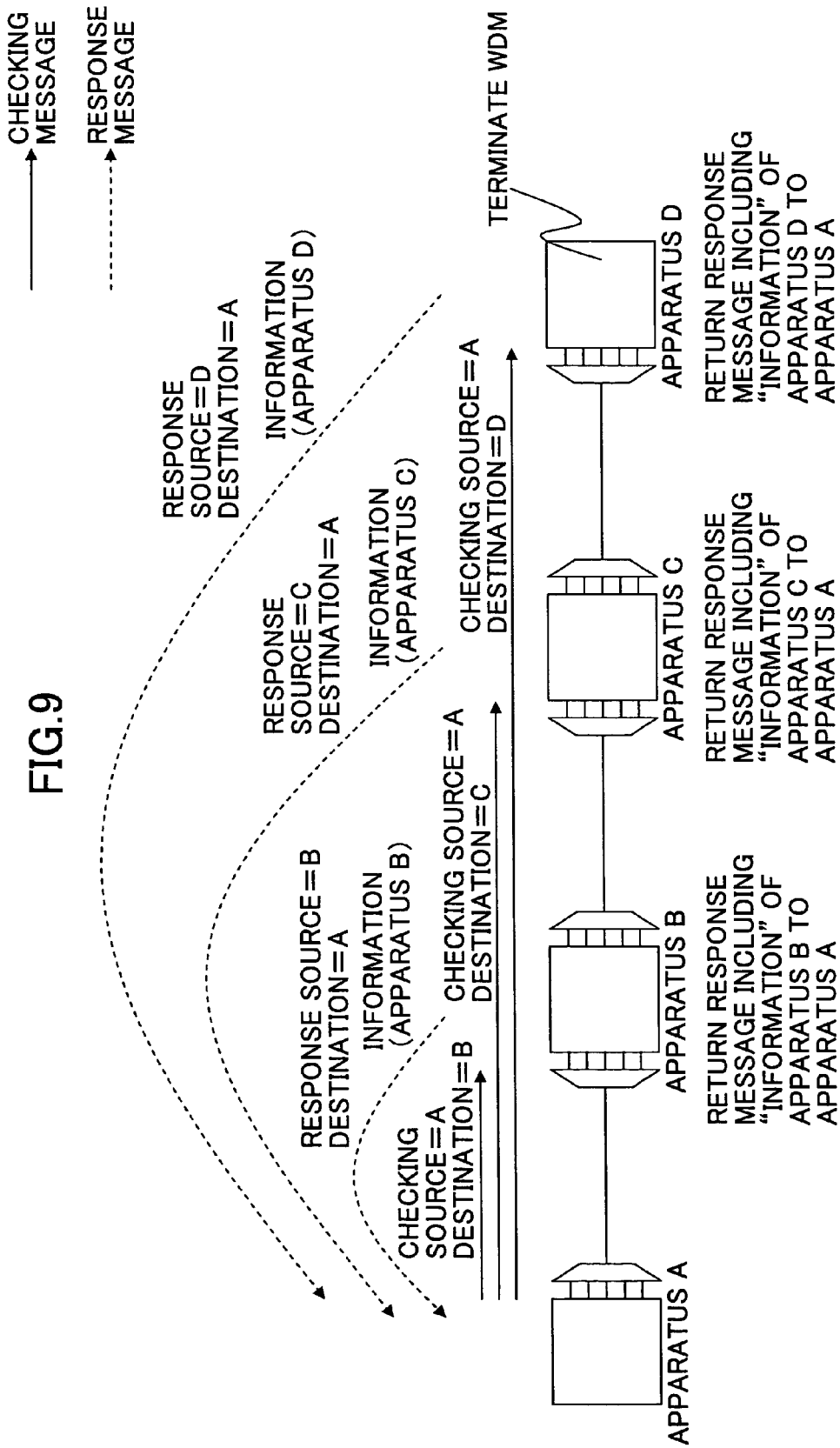
FIG. 9 shows a situation (1) in which the checking/response message is transmitted.

FIG. 9 shows a situation in which the checking/response message is transmitted. The apparatuses A-D shown in FIG. 9 corresponds to the relay nodes A-D respectively. In FIG. 9, a apparatuses are connected so as to form a bus type network configuration. The method in this embodiment can be also applied to a ring type network configuration as it is. Information on the network topology and relay nodes forming the network can be obtained by each relay node beforehand or as necessary. When the relay node A obtains constraint information of other nodes, the relay node A sends the checking message to each of other nodes. That is, the relay node A prepares a checking message for the relay node B, a checking message for the relay node C, and a checking message for the relay node D, and sends each of them. Each relay node that receives the checking message generates the response message to send it to the checking source (the source of the checking message). That is, the relay node B prepares a response message for the relay node A and sends it. This response message includes constraint information of the relay node B. Similarly, the relay node C prepares a response message for the relay node A and sends it. This response message includes constraint information of the relay node C. In addition, the relay node D prepares a response message for the relay node A and sends it. This response message includes constraint information of the relay node D.

The relay node A receives the response messages from each of the relay nodes B-D, and extracts constraints information from the messages so as to obtain the constraint information shown in FIG. 6A, 6B or 6C. After that, when establishing a connection, the relay node A refers to the constraint information of each relay node, so as to be able to select proper path candidate.

When the relay node B collects constraint information of other nodes, the relay node B sends checking messages to the relay nodes A, C and D, and similar operation is performed. This operation also applies to the relay nodes C and D.

Figure 10:
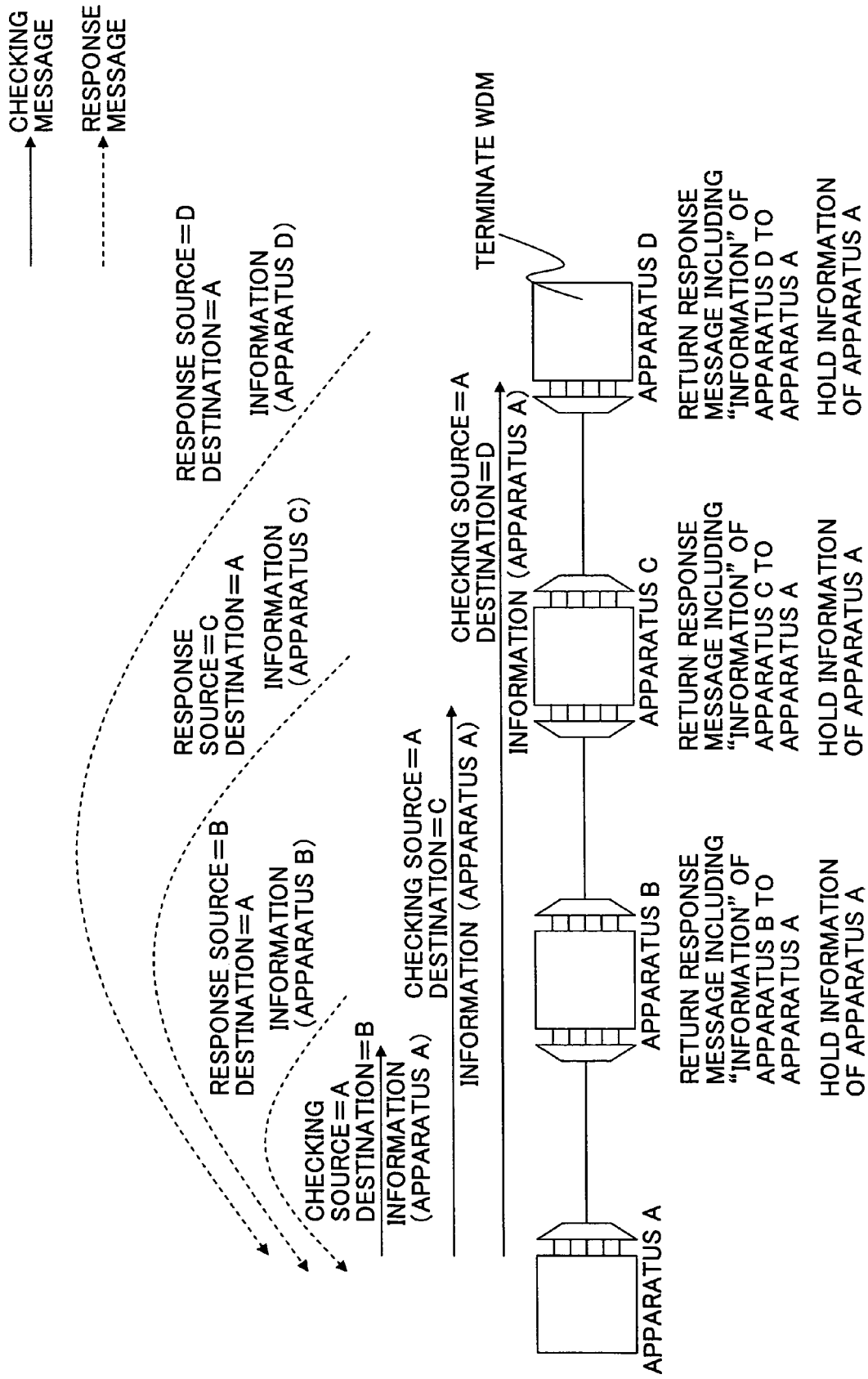
FIG. 10 shows a situation (1-2) in which the checking/response message is transmitted.

FIG. 10 shows another situation for transmitting the checking/response message. Although this method is generally the same as that shown in FIG. 9, the method of FIG. 10 is different from the method of FIG. 9 in that the checking message includes constraint information of the source of the checking. In the example shown in the figure, each of the relay nodes B, C and D obtains constraint information of the relay node A that is the source of the checking message so as to be able to store the constraint information into each database.

Therefore, after that, when the relay node B collects constraint information of other nodes, the relay node B can exclude the relay node A in a destination list of the checking message. Although not shown in the figure, the checking message from the relay node B includes the constraint information of the relay node B. Therefore, when the relay node C collects constraint information of other nodes, the relay node C can exclude the relay nodes A and B in a destination list of the checking message. Accordingly, from the viewpoint of reducing the number of sending times (traffic) of the checking/response message, it is desirable to include the constraint information of the own node into the checking message as shown in FIG. 10.

Third Embodiment

Figure 11A:
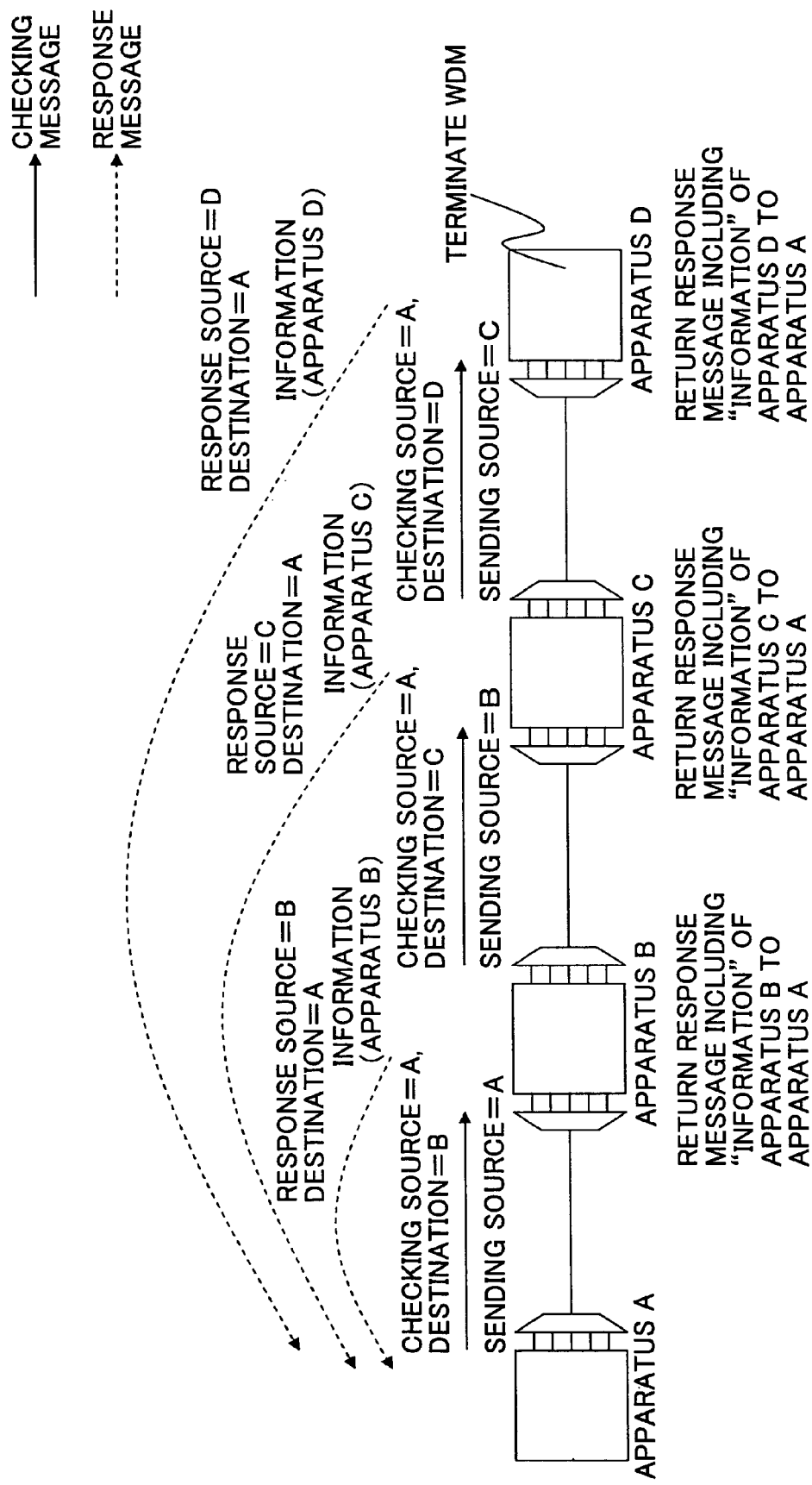
FIG. 11A shows a situation (2) in which the checking/response message is transmitted in a bus type network.

FIG. 11A shows a situation in which the checking/response message is transmitted in the bus type network. In the example shown in the figure, when collecting constraint information of other nodes, the relay node A prepares one checking message, and sends the message only to the adjacent relay node B via a high-speed side port. Different from the method of the second embodiment, the relay node A does not prepare the checking messages for the relay nodes C and D. The relay node B that receives the checking message sends a response message including the constraint information of the own node to the source (relay node A) of the checking message. In this embodiment, the relay node B sends the checking message whose checking source is the relay node A to the adjacent relay node C via a high-speed side port that is different from a high-speed side port adjacent to the relay node A that is the sending source of the checking message. The relay node C that receives the checking message sends a response message including the constraint information of the own node to the checking source (relay node A). In same way, the relay node C sends the checking message whose sending source is the relay node B to the adjacent relay node D via a high-speed side port that is different from a high-speed side port adjacent to the relay node B that is the sending source of the checking message. The relay node D that receives the checking message sends a response message including the constraint information of the own node to the checking source (relay node A). The relay node D knows that the own node is an end node, the relay node D does not further transfer the checking message.

FIG. 11B shows a situation in which the checking/response message is transmitted over the ring type network. Operation in the configuration of FIG. 11B is almost the same as that shown in FIG. 11A, but the operation of the relay node D is different. In FIG. 11B, the relay node D transfer the checking message whose checking source is the relay node A to the adjacent relay node A. Accordingly, the relay node A that receives the checking message can know that the checking message goes around the ring. In this case, it is not necessary that the relay node D prepares the response message. Or, the relay node D may send a response message in the same way as the case of FIG. 11A, and does not transfer the checking message to the relay node A. The reason is that, since a response message of the relay node D arrives at the relay node A, the relay node A can check that all necessary constraint information are collected also in this case.

According to this embodiment, the relay node that collects the constraint information needs only to prepare the checking message for the adjacent node.

FIG. 12 shows a situation in which the checking/response message is transmitted over the bus type network. Similarly to the method described in FIG. 10, the checking message includes the constraint information of the checking source. In the example shown in the figure, each of the relay nodes B, C and D that receives the checking message obtains the constraint information of the relay node A that is the checking source and stores the information in each database. Therefore, after that, for example, when the relay node B collects constraint information of other nodes, the relay node B does not need to send the checking message to the relay node A. Or, even when the relay node B sends the checking message to the relay node A, the relay node A does not need to return the response message to the relay node B. Although not shown in the figure, the checking message from the relay node B includes constraint information of the relay node B. Therefore, when the relay node C collects constraint information of other nodes, the relay node C does not need to send the checking message to the relay node B. Or, even when the relay node C sends the checking message to the relay node B, the relay node B do not need to return a response message to the relay node C. As mentioned above, from the viewpoint of reducing the number of times for sending the checking/response message (traffic), it is desirable to include the constraint information of the own node into the checking message as shown in the method shown in FIG. 12.

Figure 13B:
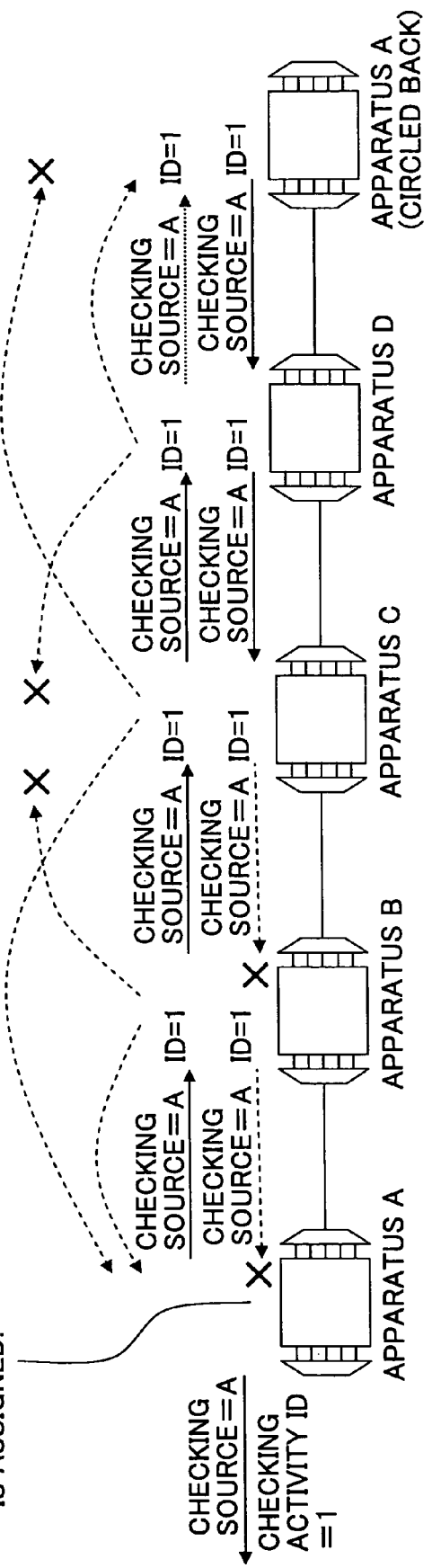
FIG. 13B shows a situation (2-3) in which the checking/response message is transmitted in a ring type network.

FIG. 13A shows a situation in which the checking/response message is transmitted in the ring type network. If each of the relay nodes independently sends the checking message bidirectionally using the method shown in FIG. 11A, each relay node redundantly sends/receives the same checking message and the same response message. In the method shown in FIG. 13B, in order to avoid such redundancy, identification information is included in the checking message. The identification information is called checking activity ID, and is assigned uniquely to the checking message when the relay node generates the checking message. Therefore, the checking activity ID may be different for each relay node and for each timing. When the checking message is sent to adjacent right and left nodes, each checking message includes the same checking activity ID. When the checking message is received by other node, the checking activity ID is identified. If a response message for a checking message having the same checking activity ID as that of the received checking message has been sent, the relay node does not send any response message (even preparing a new response message is unnecessary). In the example shown in FIG. 13B, the relay node C receives checking messages having the same checking activity ID from both of the East side (right side) and the West side (left side). If the checking message from the West side arrives first and the response message is already sent, the relay node C does not respond to the checking message received from the East side. In addition, it is stopped that the checking message received from the East side is transferred to the relay node B. Accordingly, it is avoided that the checking messages of the checking same source and the same preparation timing are transferred redundantly in the optical network, and also it can be avoided that response messages having the same information are redundantly transmitted in the optical network.

Figure 14A:
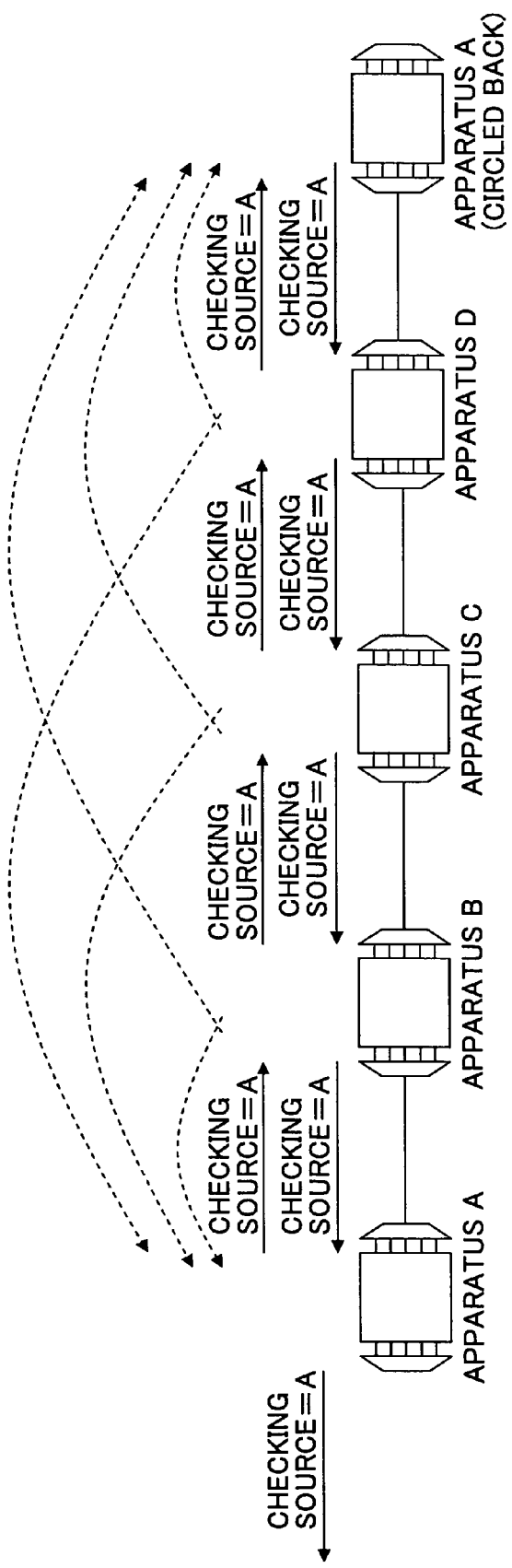
FIG. 14A shows a situation (2-4) in which the checking/response message is transmitted in a ring type network.
Figure 14B:
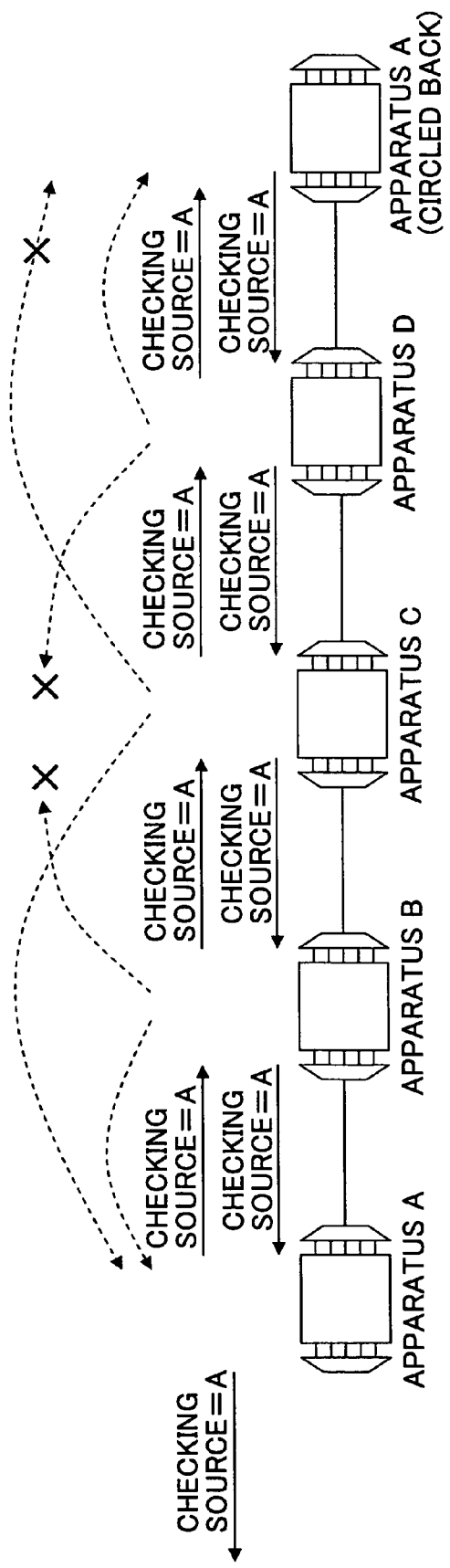
FIG. 14B shows a situation (2-4) in which the checking/response message is transmitted in a ring type network.

FIG. 14A is merely shown for comparison with FIG. 14B, and FIG. 14A shows similar situation as that shown in FIG. 13A. FIG. 14B shows a situation in which the checking/response message is transmitted in the ring type network. In the example shown in FIG. 14B, information in the response message is stored in each node for at least a predetermined period. When receiving the checking message, the relay node generates the response message, and the relay node checks whether the response massage is the same as the stored response message. Especially, it is checked whether the checking source nodes are the same, and whether the constraint information are the same. When the new and old response messages are not the same, the newly generated response message is sent. But, when the messages are the same, the message is not sent since the message is already sent. According to this embodiment, it can be avoided to send/receive redundant checking/response messages without adding a filed such as the checking activity ID to the checking message.

Fourth Embodiment

Figure 15A:
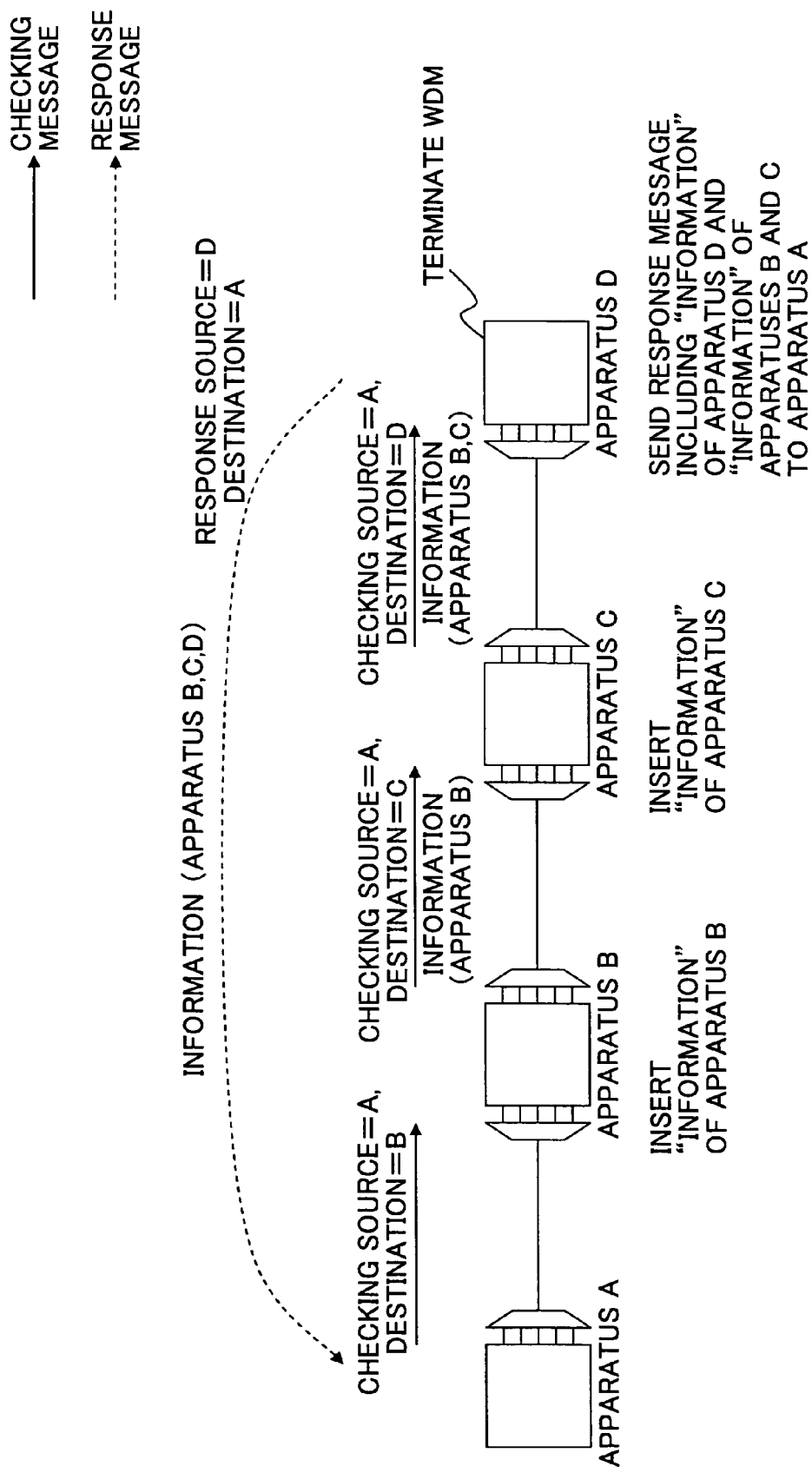
FIG. 15A shows a situation (3) in which the checking/response message is transmitted in a bus type network.

FIG. 15A shows a situation in which the checking/response message is transmitted in the bus type network. In the example shown in the figure, the relay node A that collects constraint information of other nodes generates one checking message, and sends the message to one adjacent relay node B. The relay node B includes constraint information of the own node into the received checking message, and transfer the message to the adjacent relay node C. The relay node C includes constraint information of the own node into the received checking message and transfers the message to the adjacent relay node C. The checking message transferred in this stage includes constraint information of the relay nodes B and C. Different from the method shown in FIG. 11A and the like, each of the relay nodes B and C does not send the response message to the checking source. The relay node D that receives the checking message extracts constraint information of non-end nodes (relay nodes B and C) from the checking message, and generates a response message including the information. The response message also includes constraint information of the own node (relay node D). The destination of the response message is the relay node A that is the checking source. Since the response message generated in this way includes all constraint information of the relay nodes (B, C and D) other than the checking source, the source node A can obtain all of necessary constraint information. In this embodiment, only an end node generates and send the response message, and the non-end node includes constraint information of the own node into the received checking message and transfers it, but does not generate the response message. Accordingly, only one response message can be used for each checking activity.

Figure 15B:
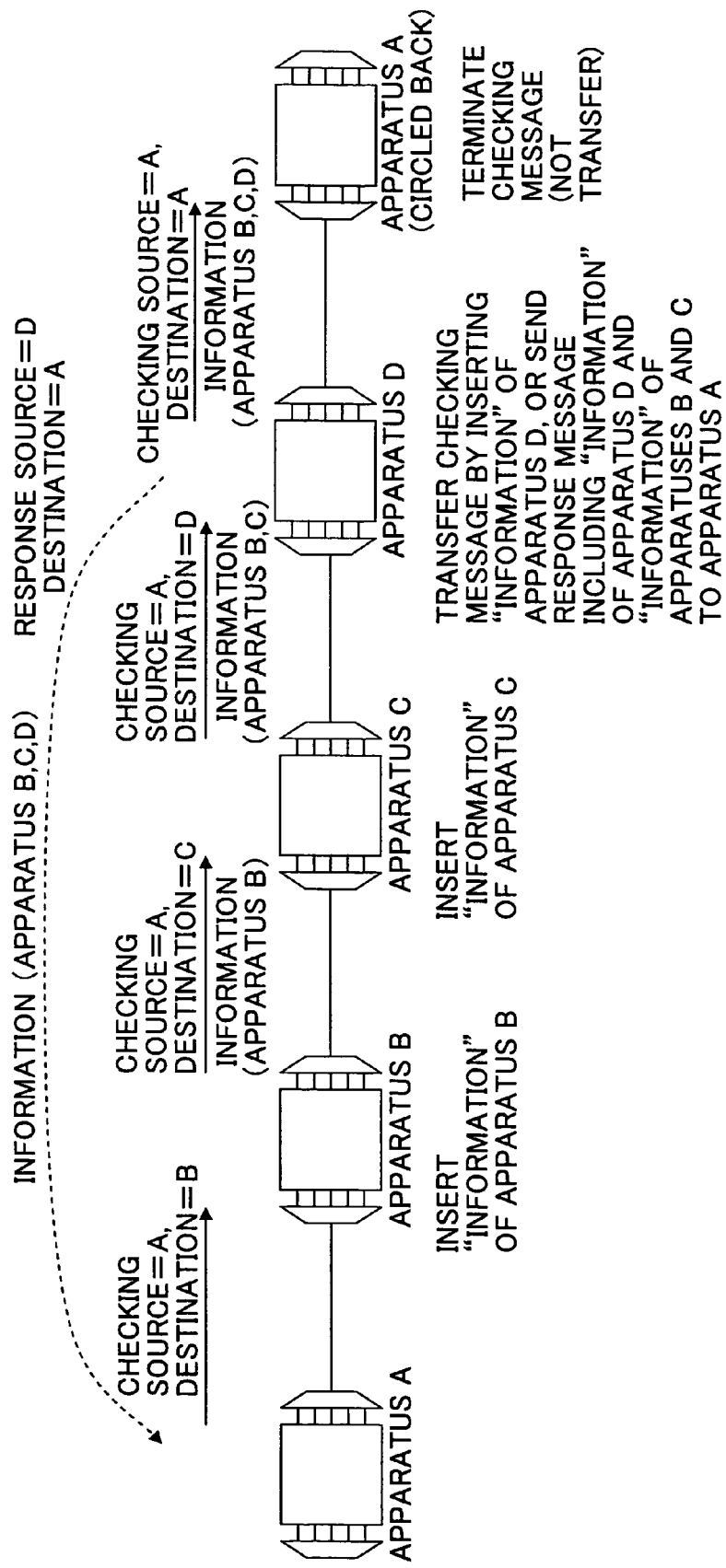
FIG. 15B shows a situation (3) in which the checking/response message is transmitted in a ring type network.

FIG. 15B shows a situation in which the checking/response message is transmitted over the ring type network. Operation in the configuration of FIG. 15B is almost the same as that shown in FIG. 15A, but the operation of the relay node D is different. In FIG. 15B, similar to the relay nodes B and c, the relay node D includes the constraint information of the own node to the received checking message and transfers the checking message. The transfer destination is the relay node A that us the checking source. The checking message transferred at this stage includes the constraint information of the relay nodes B, C and D. Accordingly, the relay node A that receives the checking message can know that the checking message goes around the ring. In this case, it is not essential that the relay node D sends the response message. When the response message is not sent from the relay node D, this operation is the same as that of the first embodiment. Or, the relay node D may prepare and send a response message in the same way as the case of FIG. 15A, and does not transfer the checking message to the relay node A. The reason is that, since the response message of the relay node D arrives at the relay node A, the relay node A can check that all necessary constraint information are collected also in this case.

FIG. 16 shows a situation in which the checking/response message is transmitted over the bus type network. In the example shown in the figure, the constraint information of the checking source is included in the checking message. Each of the relay nodes B, C and D that receives the checking message obtains the constraint information of the relay node A that is the checking source and stores the information in each database. Therefore, after that, for example, when the relay node B collects constraint information of other nodes, the relay node B does not need to send the checking message to the relay node A. Although not shown in the figure, the checking message from the relay node B includes constraint information of the relay node B. Therefore, when the relay node C collects constraint information of other nodes, the relay node C does not need to send the checking message to the relay node B. As mentioned above, from the viewpoint of reducing the number of times for sending the checking/response message (traffic), it is desirable to include the constraint information of the own node into the checking message as shown in the method shown in FIG. 16.

Fifth Embodiment

Figure 17A:
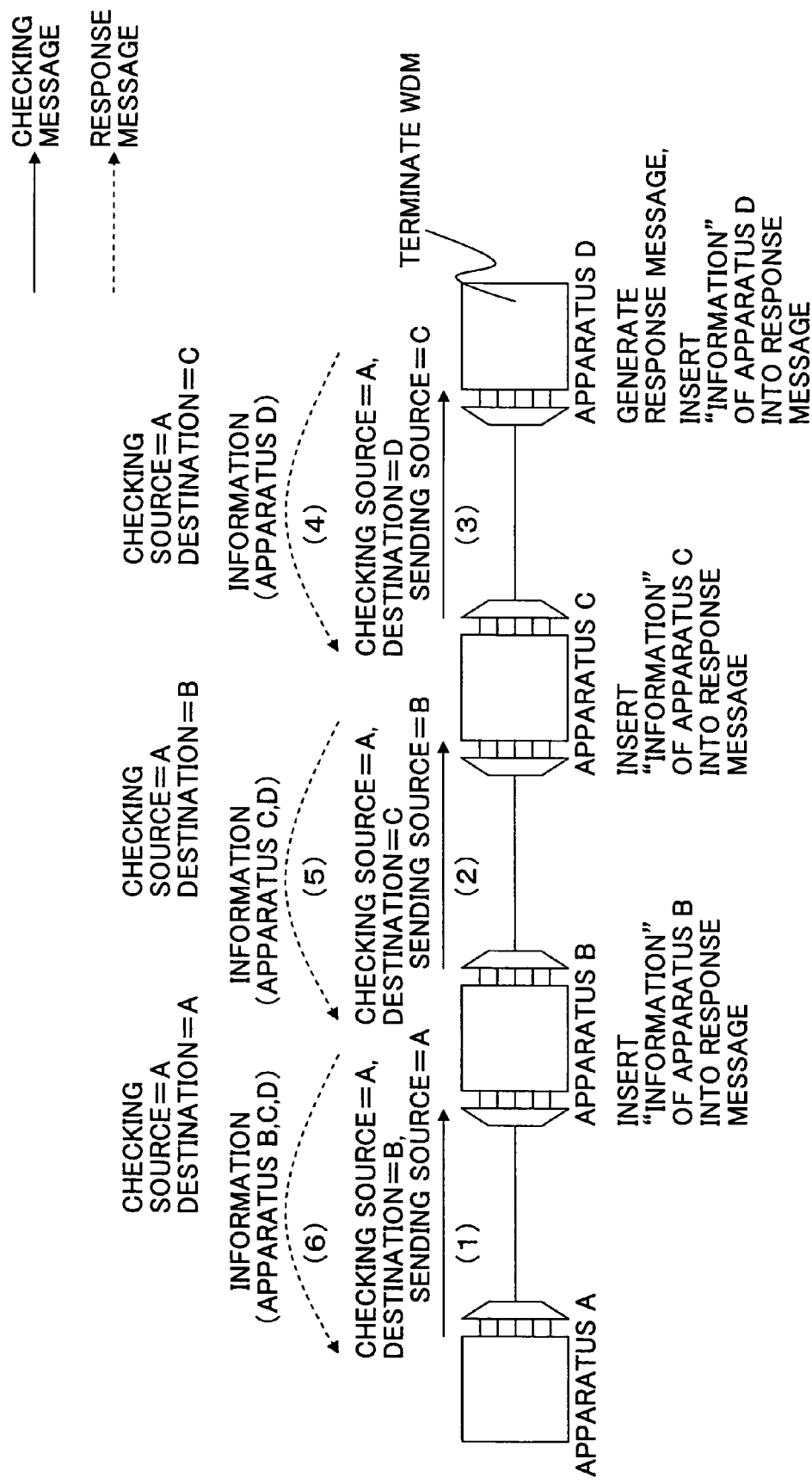
FIG. 17A shows a situation (4) in which the checking/response message is transmitted in a bus type network.

FIG. 17A shows a situation in which the checking/response message is transmitted in the bus type network. In the example shown in the figure, the relay node A that collects constraint information of other nodes prepares one checking message and sends it only to one adjacent relay node B. The relay node B transfers the checking message whose checking source is the relay node A to the adjacent relay node C. The relay node C sends the checking message whose checking source is the relay node A to the adjacent relay node D. The checking message that is generated in the relay node A and that is transferred in the relay node B and C has the same information. The relay node D sends a response message including constraint information of the own node to a relay node (relay node C) of the previous stage. The relay node D knows that the own node is an end node and that the relay node D should respond to the checking message. The relay node C adds constraint information of the own node to the response message received from the relay node D, and sends the message to a previous relay node (relay node B). The relay node B adds constraint information of the own node to the response message received from the relay node C, and sends the message to a previous relay node (relay node A). At this stage, the response message includes all constraint information of the relay node B, C and D, so that the relay node A can obtain all necessary constraint information.

FIG. 17B shows a situation in which the checking/response message is transmitted over the ring type network. Operation in the configuration of FIG. 17B is almost the same as that shown in FIG. 17A, but the operation of the relay node D is different. In FIG. 17B, the relay node D transfers the checking message received from the relay node D to the adjacent relay node A. Accordingly, the relay node A that receives the checking message can know that the checking message goes around the ring. Or, the relay node D may not send the checking message in the same way as the case of FIG. 17A. The reason is that, the checking message transferred from the relay node D to the relay node A has the same information as that generated in the relay node A, and that, constraint information of other nodes cannot be ascertained unless the response message is received.

According to this embodiment, the checking/response message can be transmitted in a transmission sequence the same as the signaling protocol such as the RSVP-TE of the GMPLS protocol and the like. Therefore, the method of this embodiment is advantageous in that the existing GMPLS protocol can be easily introduced.

Figure 18:
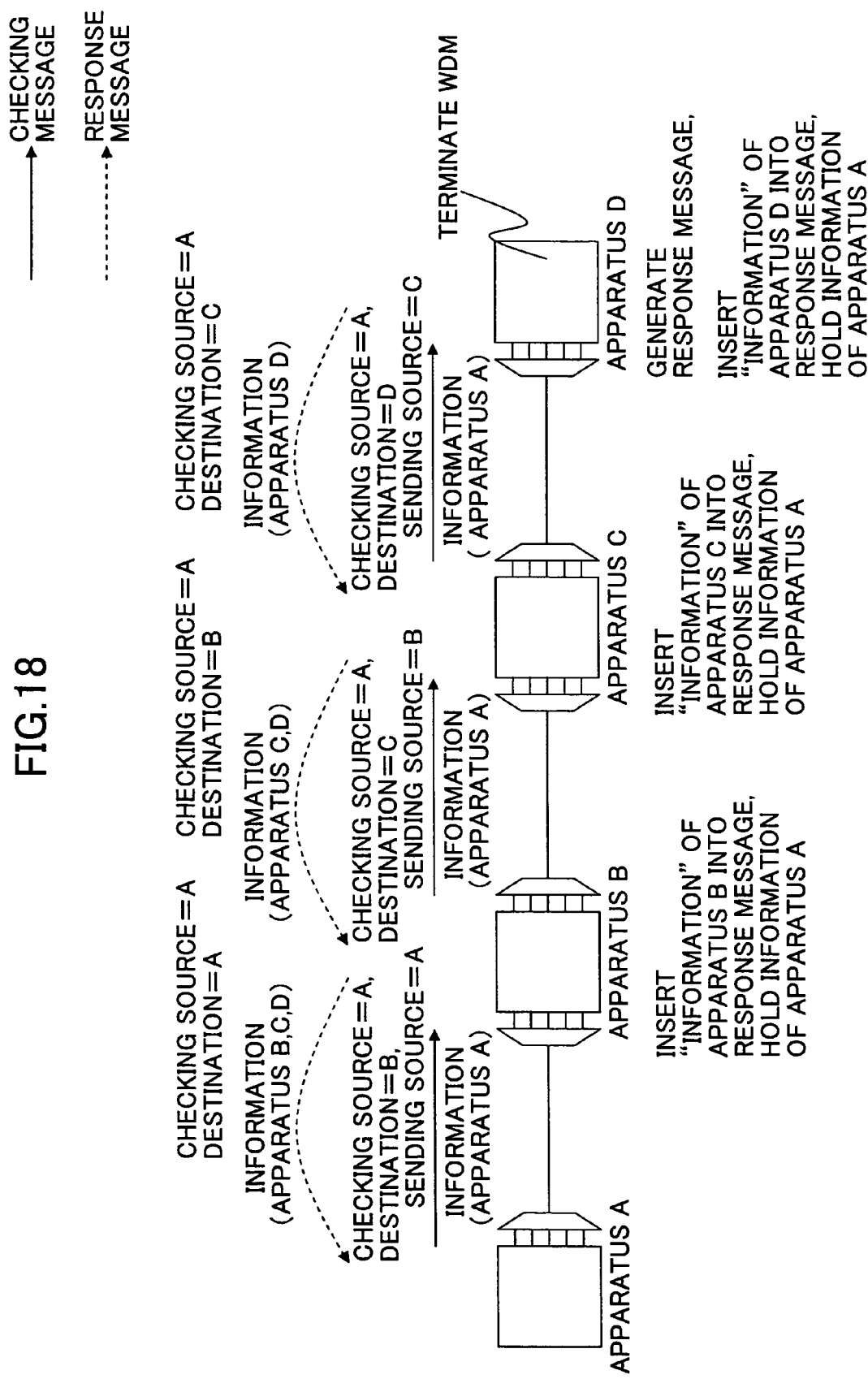
FIG. 18 shows a situation (4-2) in which the checking/response message is transmitted in a bus type network.

FIG. 18 shows a situation in which the checking/response message is transmitted in the bus type network. Like the method described in FIG. 10, the checking message includes constraint information of the checking source. In the example shown in the figure, each of the relay nodes B, C and D that receives the checking message obtains the constraint information of the relay node A of the checking source so as to be able to store it in each database. Therefore, after that, for example, when the relay node B collects constraint information of other nodes, it is not necessary that the relay node B send the checking message to the relay node A. Although not shown in the figure, the checking message from the relay node B includes the constraint information of the relay node B. Therefore, when the relay node C collects constraint information of other nodes, it is not necessary that the relay node C sends the checking message to the relay node B. Accordingly, from the viewpoint of reducing the number of sending times of the checking/response message (traffic), it is desirable to include the constraint information of the own node into the checking message like the method shown in FIG. 18.

As to embodiments described so far, one or more embodiments can be used as necessary.

The present invention is not limited to the specifically disclosed embodiments, and variations and modifications may be made without departing from the scope of the present invention.

The present application contains subject matter related to Japanese patent application No.2006-91870, filed in the JPO on Mar. 29, 2006, the entire contents of which are incorporated herein by reference.

What is claimed is:

1. A relay node used in a WDM optical network, comprising:
  a high-speed side port configured to add/drop optical signals of various wavelengths;
  a low-speed side port configured to add/drop optical signals of a single wavelength;
  a unit configured to generate a checking message for requesting another node to report constraint information of a low-speed side port of the another node, wherein the constraint information relates to adding an optical signal from the low-speed side port to a high-speed side port of the another node or dropping an optical signal from the high-speed side port to the low-speed side port of the another node;
  a unit configured to generate a response message including the constraint information of the own node in response to receiving the checking message sent from another node; and
  a storing unit configured to store at least the constraint information of the another node;
  wherein the constraint information includes information on wavelength of the optical signal that can be added/dropped by the high-speed side port and the low-speed side port.

2. The relay node as claimed in claim 1, wherein the checking message is sent when the relay node starts up.

3. The relay node as claimed in claim 1, wherein the checking message is sent periodically.

4. The relay node as claimed in claim 1, wherein the checking message is sent when usage of both or one of the high-speed side port and the low-speed-side port is changed.

5. The relay node as claimed in claim 1, wherein both or one of the checking message and the response message is transmitted via the high-speed side port.

6. The relay node as claimed in claim 1, both or one of the checking message and the response message is transmitted over a line that is prepared separately from an optical fiber for the WDM optical network.

7. The relay node as claimed in claim 1, both or one of the checking message and the response message includes identification information of a destination node, a source node, a checking source node and the low-speed side port.

8. The relay node as claimed in claim 1, wherein the constraint information includes information indicating a use status of the low-speed side port.

9. The relay node as claimed in claim 1, wherein the constraint information includes information indicating a high-speed side port to which an optical signal can be added or from which an optical signal can be dropped.

10. The relay node as claimed in claim 1, wherein the checking message sent from the own node includes constraint information of the own node.

11. The relay node as claimed in claim 1, wherein the checking message is generated and sent individually for each of other nodes.

12. The relay node as claimed in claim 1, wherein the checking message is sent only to an adjacent other node.

13. The relay node as claimed in claim 12, wherein when a checking source of a checking message received from another node is the own node, transfer of the checking message to the adjacent other node is prohibited.

14. The relay node as claimed in claim 1, wherein the checking message sent from a checking source is transmitted to a plurality of adjacent nodes.

15. The relay node as claimed in claim 1, wherein the checking message includes checking identification information that is assigned to the checking message when the checking message is generated.

16. The relay node as claimed in claim 15, wherein when the relay node receives the checking message including checking identification information the same as checking identification information of another checking message corresponding to a response message which is already sent, generation of a response message is prohibited.

17. The relay node as claimed in claim 1, wherein when a generated new response message is the same as a response message that is already sent, transmission of the new response message is prohibited

18. The relay node as claimed in claim 1, wherein when the relay node is an end node of a bus type WDM optical network, the relay node sends a response message, and the checking message sent from the own node includes constraint information of the own node.

19. The relay node as claimed in claim 1, wherein constraint information of the own node is added to the checking message received from an adjacent node, and the checking message to which the constraint information is added is sent to another adjacent node or to a checking source.

20. The relay node as claimed in claim 19, wherein a response message is sent to the adjacent node.

* * * * *